US012784585B2

(12) United States Patent
Ikefuji et al.

(10) Patent No.: US 12,784,585 B2
(45) Date of Patent: Nov. 3, 2026

(54) SIGNAL ANALYSIS APPARATUS, SIGNAL ANALYSIS METHOD, AND COMPUTER-READABLE MEDIUM

(71) Applicant: NEC Corporation, Tokyo (JP)

(72) Inventors: Daisuke Ikefuji, Tokyo (JP); Tomoyuki Hino, Tokyo (JP); Hemant Shivsagar Prasad, Tokyo (JP); Murtuza Petladwala, Tokyo (JP)

(73) Assignee: NEC CORPORATION, Tokyo (JP)

( * ) Notice: Subject to any disclaimer, the term of this patent is extended or adjusted under 35 U.S.C. 154(b) by 169 days.

(21) Appl. No.: 18/722,656

(22) PCT Filed: Dec. 27, 2021

(86) PCT No.: PCT/JP2021/048609
§ 371 (c)(1),
(2) Date: Jun. 21, 2024

(87) PCT Pub. No.: WO2023/127033
PCT Pub. Date: Jul. 6, 2023

(65) Prior Publication Data

US 2025/0140109 A1 May 1, 2025

(51) Int. Cl.

| | |
|---|---|
| ***G08G 1/00*** | (2006.01) |
| ***G08G 1/01*** | (2006.01) |
| ***G08G 1/04*** | (2006.01) |
| ***G08G 1/052*** | (2006.01) |

(52) U.S. Cl.
CPC ........... *G08G 1/052* (2013.01); *G08G 1/0133* (2013.01); *G08G 1/04* (2013.01)

(58) Field of Classification Search
CPC ........ G08G 1/052; G08G 1/0133; G08G 1/04; G08G 1/0116; G08G 1/01; G08G 1/00
USPC .......................................................... 701/119
See application file for complete search history.

(56) References Cited

U.S. PATENT DOCUMENTS

| | | | | |
|---|---|---|---|---|
| 2008/0071465 | A1* | 3/2008 | Chapman | G01C 21/3691 701/117 |
| 2016/0275788 | A1* | 9/2016 | Wu | G08G 1/02 |
| 2018/0266902 | A1* | 9/2018 | Logan | G01B 11/16 |
| 2018/0342156 | A1* | 11/2018 | Martin | G08G 1/052 |
| 2021/0304497 | A1* | 9/2021 | Jin | G06Q 40/08 |

FOREIGN PATENT DOCUMENTS

| | | |
|---|---|---|
| JP | 2009-529187 A | 8/2009 |
| JP | 2021-121917 A | 8/2021 |

OTHER PUBLICATIONS

International Search Report for PCT Application No. PCT/JP2021/048609, mailed on Mar. 15, 2022.

* cited by examiner

*Primary Examiner* — Shardul D Patel

(57) ABSTRACT

Provided is a signal analysis apparatus capable of appropriately detecting an event. A signal analysis apparatus includes an estimation unit and an event detection unit. The estimation unit estimates a speed of a vehicle traveling on a road at each of times at each of positions on the road using a signal obtained by measuring the road. The event detection unit detects an event occurring on the road based on at least one of a corrected speed obtained by performing a smoothing process on an estimated speed and an inaccuracy degree indicating a degree of inaccuracy of the estimated speed.

18 Claims, 16 Drawing Sheets

SIGNAL ANALYSIS APPARATUS, SIGNAL ANALYSIS METHOD, AND COMPUTER-READABLE MEDIUM

This application is a National Stage Entry of PCT/JP2021/048609 filed on Dec. 27, 2021, the contents of all of which are incorporated herein by reference, in their entirety.

TECHNICAL FIELD

The present invention relates to a signal analysis apparatus, a signal analysis method, and a computer-readable medium.

BACKGROUND ART

Techniques for estimating speeds of vehicles traveling on roads using signals obtained through measurement by sensing apparatuses are known. With regard to the techniques, Patent Literature 1 discloses a method of estimating traffic flow characteristics (average traffic speed, the number of vehicles, speed of each vehicle, and the like) using optical fibers that are along many roads.

CITATION LIST

Patent Literature

Patent Literature 1: Japanese Unexamined Patent Application Publication No. 2021-121917

SUMMARY OF INVENTION

Technical Problem

It is desirable to detect an event such as congestion or an accident using an estimated speed. Here, the signal acquired through the measurement in the sensing apparatus may include an element such as noise that has an adverse influence on the signal. In the method of estimating the speed of a vehicle using a signal including noise or the like, it is difficult to accurately estimate a speed due to the influence of noise or the like. Accordingly, there is concern of an event not being able to be detected appropriately.

An object of the present disclosure is to solve such a problem and is to provide a signal analysis apparatus, a signal analysis method, and a computer-readable medium capable of appropriately detecting an event.

Solution to Problem

According to an aspect of the present disclosure, a signal analysis apparatus includes: estimation means for estimating a speed of a vehicle traveling on a road at each of times at each of positions on the road using a signal obtained by measuring the road; and event detection means for detecting an event occurring on the road based on at least one of a corrected speed obtained by performing a smoothing process on an estimated speed that has been estimated and an inaccuracy degree indicating a degree of inaccuracy of the estimated speed.

According to another aspect of the present disclosure, a signal analysis method includes estimating a speed of a vehicle traveling on a road at each of times at each of positions on the road using a signal obtained by measuring the road; and detecting an event occurring on the road based on at least one of a corrected speed obtained by performing a smoothing process on an estimated speed that has been estimated and an inaccuracy degree indicating a degree of inaccuracy of the estimated speed.

According to still another aspect of the present disclosure, a program causes a computer to execute: a step of estimating a speed of a vehicle traveling on a road at each of times at each of positions on the road using a signal obtained by measuring the road; and a step of detecting an event occurring on the road based on at least one of a corrected speed obtained by performing a smoothing process on an estimated speed that has been estimated and an inaccuracy degree indicating a degree of inaccuracy of the estimated speed.

Advantageous Effects of Invention

According to the present disclosure, it is possible to provide a signal analysis apparatus, a signal analysis method, and a computer-readable medium capable of appropriately detecting an event.

EXAMPLE EMBODIMENT

Overview of Example Embodiment According to Present Disclosure

Figure 1:
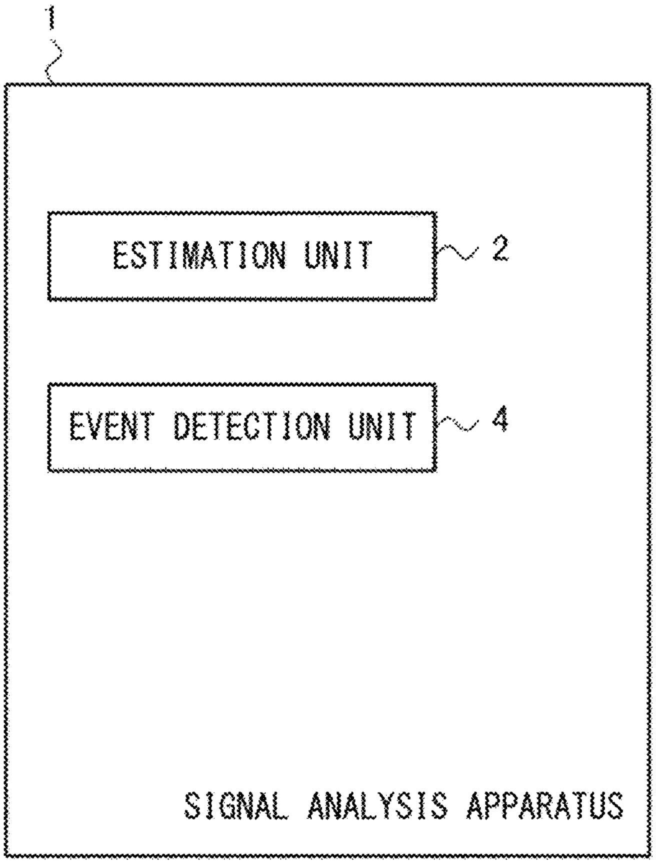
FIG. 1 is a diagram illustrating an overview of a signal analysis apparatus according to an example embodiment of the present disclosure.
Figure 2:
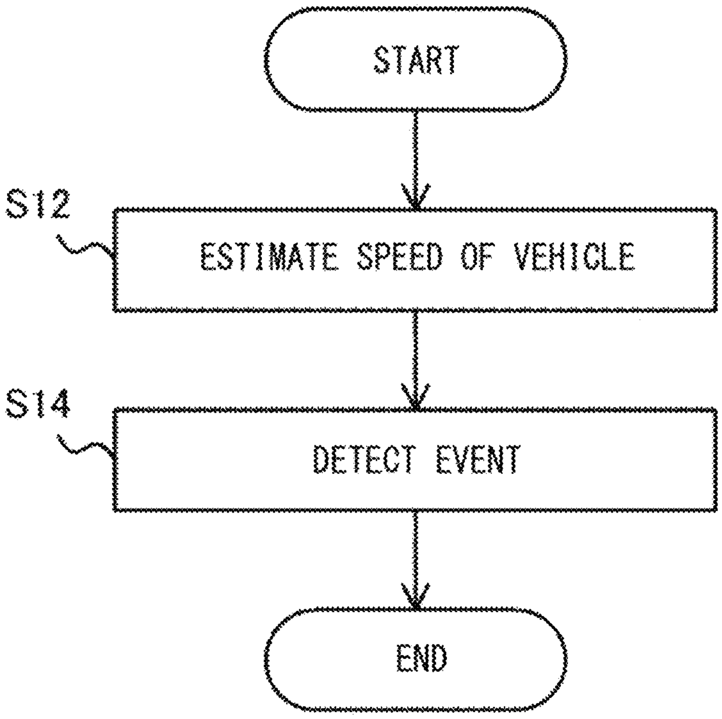
FIG. 2 is a diagram illustrating an overview of a signal analysis method executed by the signal analysis apparatus according to the example embodiment of the present disclosure.

Before an example embodiment of the present disclosure is described, an overview of the example embodiment according to the present disclosure will be described. FIG. 1 is a diagram illustrating an overview of a signal analysis apparatus 1 according to an example embodiment of the present disclosure. FIG. 2 is a diagram illustrating an overview of a signal analysis method executed by the signal analysis apparatus 1 according to the example embodiment of the present disclosure.

The signal analysis apparatus 1 includes an estimation unit 2 and an event detection unit 4. The estimation unit 2 has a function as estimation means. The event detection unit 4 has a function as event detection means. The signal analysis apparatus 1 can be realized by, for example, a computer.

The estimation unit 2 estimates a speed of a vehicle traveling on a road (step S12). Specifically, the estimation unit 2 estimates a speed of a vehicle traveling on a road at each of times at each of positions on the road using a signal obtained by measuring the road. The signal obtained through the measurement can be obtained by, for example, a sensing apparatus for optical fiber sensing or the like to be described below. An estimated speed that has been estimated can be calculated at each time for each position on the road. Details will be described below.

The event detection unit 4 detects an event using the estimated speed (step S14). Specifically, the event detection unit 4 detects an event occurring on the road based on at least one of the corrected speed obtained by performing the smoothing process on the estimated speed and the inaccuracy degree indicating the degree of inaccuracy of the estimated speed. Here, the "event" is any event occurring on a road. In particular, a speed of a vehicle traveling on a road changes because the event occurs. For example, in the present exemplary example embodiment, the "event" is an event that causes a decrease in speed of the vehicle, but the present invention is not limited thereto. The "event" is, for example, congestion or an accident on a road, but the present invention is not limited thereto.

Also, the "inaccuracy degree" means a degree to which a corresponding estimated speed may be considered to be inaccurate. For example, when the estimated speed is unnaturally slower (or faster) than an estimated speed at a nearby position at that time, the inaccuracy degree related to the estimated speed may be large. When the estimated speed is unnaturally slower (or faster) than the estimated speed at that position at a nearby time, the inaccuracy degree related to the estimated speed may increase. Details will be described below. The inaccuracy degree may indicate the degree of abnormality of an estimated speed. Alternatively, the inaccuracy degree may indicate the degree of unsuitability of the estimated speed. In addition, the inaccuracy degree may indicate validity of the estimated speed. In this case, as the validity of the estimated speed increases, the inaccuracy degree may decrease. The inaccuracy degree may indicate reliability of the estimated speed. In this case, as the reliability of the estimated speed increases, the inaccuracy degree may decrease.

Comparative Example

Here, optical fiber sensing according to a comparative example will be described.

Figure 3:
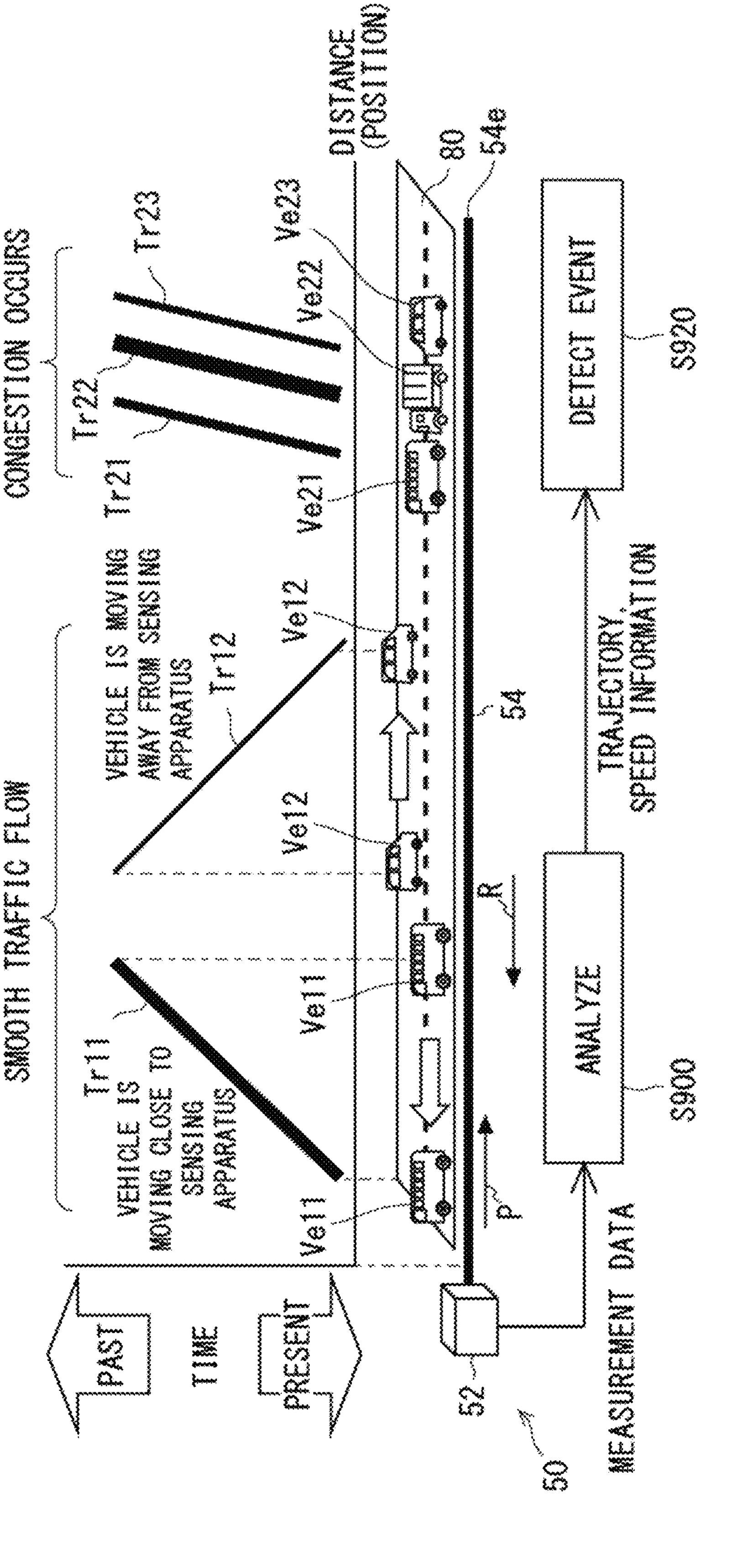
FIG. 3 is a diagram illustrating optical fiber sensing according to a comparative example.

FIG. 3 is a diagram illustrating optical fiber sensing according to the comparative example. Optical fiber sensing is used to monitor roads over a wide area. An optical fiber sensing system 50 that implements optical fiber sensing includes a sensing apparatus 52 and an optical fiber cable 54. The optical fiber cable 54 is laid along a road 80. The sensing apparatus 52 is connected to one end of the optical fiber cable 54.

The sensing apparatus 52 can be implemented by, for example, a distributed acoustic sensing (DAS) technique. The sensing apparatus 52 can detect vibration generated at a position at which the optical fiber cable 54 is provided. Specifically, as indicated by an arrow P, the sensing apparatus 52 causes pulsed light (sensing signal) to be incident on the optical fiber cable 54 toward a termination 54*e* of the optical fiber cable 54. The termination 54*e* is subjected to a termination process of curbing reflection of the pulsed light. Alternatively, the optical fiber cable 54 may not be subjected to the termination process.

Here, when the pulsed light is incident on the optical fiber cable 54, returned light called backscattered light is generated as indicated by an arrow R. That is, the optical fiber cable 54 is not uniform. Therefore, when pulsed light enters the optical fiber cable 54, returned light is generated at every position of the optical fiber cable 54. The sensing apparatus 52 observes the returned light chronologically.

Then, when vibration is applied to a certain position X of the optical fiber cable 54 by a vehicle traveling on the road 80 near the position X, quality (amplitude, light intensity, or the like) of returned light generated at the position changes. The sensing apparatus 52 can calculate the generation position X of the returned light of which the quality changes with a round-trip time of the light. Specifically, it is assumed that a distance from the sensing apparatus 52 to the position X at which the returned light of which the quality changes is generated is L, it can be assumed that c is the speed of light in vacuum, and n is a refractive index of an optical fiber. In this case, a time from incidence of the pulsed light by the sensing apparatus 52 to return of the returned light generated at the position X to the sensing apparatus 52 is expressed as 2 Ln/c. Thus, the distance L from the sensing apparatus 52 to the position X can be calculated by measuring the time from the incidence of the pulsed light by the sensing apparatus 52 to the return of the returned light. By preventing the sensing apparatus 52 from emitting the next pulsed light from the incidence of the pulsed light by the sensing apparatus 52 to the return of the returned light, it is possible to curb (i.e., prevent or reduce) mixing of the pulsed light in the optical fiber cable 54.

In this way, the sensing apparatus 52 acquires measurement data obtained by measuring the returned light (signal) at each position of the optical fiber cable 54 chronologically by measuring the road 80. Then, the optical fiber sensing system 50 can detect a position and a time at which vibration is generated by the vehicle traveling on the road 80 by analyzing a change in quality such as intensity or amplitude of the returned light. Thus, the optical fiber sensing system 50 can detect a position at which the vehicle is traveling at a certain time. Further, the sensing apparatus 52 can acquire a traveling trajectory of the vehicle traveling on the road 80 by performing the position detection chronologically. Details will be described below.

In FIG. 3, a trajectory Tr11 indicates a traveling trajectory of a vehicle Ve11. A trajectory Tr12 indicates a traveling trajectory of a vehicle Ve12. A trajectory Tr21 indicates a traveling trajectory of a vehicle Ve21. A trajectory Tr22 indicates a traveling trajectory of a vehicle Ve22. A trajectory Tr23 indicates a traveling trajectory of a vehicle Ve23.

Here, the trajectory Tr is indicated by a graph in which the horizontal axis represents a position (a distance from the sensing apparatus 52) and a vertical axis represents time. In FIG. 3, the right direction on the horizontal axis indicates the distance from the sensing apparatus 52. That is, the left side of the horizontal axis indicates a position closer to the sensing apparatus 52, and the right side of the horizontal axis indicates a position farther from the sensing apparatus 52. In FIG. 3, the downward direction of the vertical axis indicates the passage of time. That is, the lower side of the vertical axis indicates a time closer to the present, and the upper side indicates a past time.

Accordingly, when an inclination of the trajectory Tr is oriented from the top right to the bottom left (downward to the left), the trajectory Tr indicates that a corresponding vehicle Ve is traveling in a direction approaching the sensing apparatus 52. On the other hand, when the inclination of the trajectory Tr is oriented from the top left to the bottom right (downward to the right), the trajectory Tr indicates that the corresponding vehicle Ve is traveling in a direction away from the sensing apparatus 52. Accordingly, the vehicle Ve11 corresponding to the left-downward trajectory Tr11 is traveling in a direction approaching the sensing apparatus 52. The vehicle Ve12 corresponding to the right-downward trajectory Tr12 is traveling in a direction away from the sensing apparatus 52. The vehicle Ve21 corresponding to the left-downward trajectory Tr21 is traveling in a direction approaching the sensing apparatus 52. Similarly, the vehicles Ve22 and Ve23 respectively corresponding to the left-downward trajectories Tr22 and Tr23 are traveling in a direction approaching the sensing apparatus 52.

The inclination of the trajectory Tr corresponds to a speed of the corresponding vehicle Ve. Specifically, a gentle inclination of the trajectory Tr indicates that the corresponding vehicle Ve is traveling smoothly, that is, there is a high likelihood that the vehicle Ve is traveling at a normal traveling speed. Conversely, a steep inclination of the trajectory Tr indicates that the traveling of the corresponding vehicle Ve is congested, that is, there is a high likelihood that the vehicle Ve is traveling at a speed lower than the normal traveling speed. In other words, a steep inclination of the trajectory Tr indicates a high likelihood that the corresponding vehicle Ve is caught in congestion or encountering a problem such as an accident. Accordingly, there is a high likelihood that the vehicles Ve11 and Ve12 respectively corresponding to the gently inclined trajectories Tr11 and Tr12 are smoothly traveling. Conversely, there is a high likelihood that the vehicles Ve21, Ve22, and Ve23 respectively corresponding to the steeply inclined trajectories Tr21, Tr22, and Tr23 are caught in congestion or the like.

The optical fiber sensing system 50 estimates a traveling trajectory of the vehicle and a speed of the vehicle by analyzing a signal (measurement data) obtained by the sensing apparatus 52 (step S900). Here, the measurement data is time waveform data (time-series data) of a change in phase of the returned light occurring at each position of the optical fiber cable 54. This change in phase corresponds to intensity of vibration ascertained at each position of the optical fiber cable 54. The optical fiber sensing system 50 detects an event such as congestion or an accident using the estimated speed (step S920). That is, an event may be detected if the estimated speed is extremely slow at a certain time at a certain position.

Figure 4:
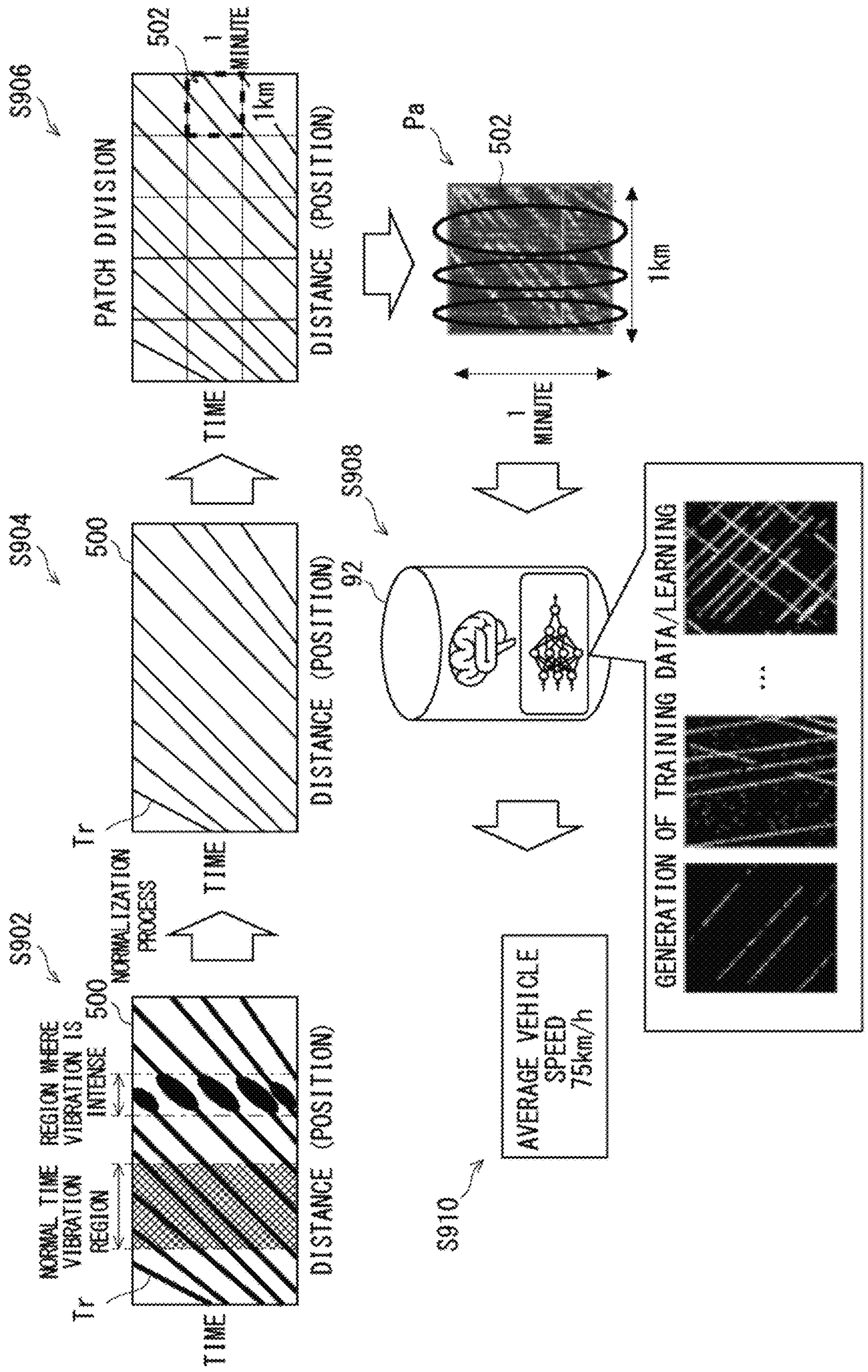
FIG. 4 is a diagram illustrating a method in which an optical fiber sensing system according to the comparative example estimates a speed of a vehicle.

FIG. 4 is a diagram illustrating a method (S900) in which the optical fiber sensing system 50 according to the comparative example estimates the speed of the vehicle. The optical fiber sensing system 50 acquires traveling trajectory data 500 indicating the traveling trajectory of each vehicle using the measurement data obtained by the sensing apparatus 52 (step S902). Each line of the traveling trajectory data 500 indicates a traveling trajectory Tr of each vehicle traveling on the road 80. Here, as described above, the measurement data is the time-series data of the change in phase (intensity of vibration) of the returned light occurring at each position of the optical fiber cable 54, and the traveling trajectory data 500 is obtained by drawing points with an intensity equal to or higher than a predetermined threshold of the measurement data on the space and time. That is, for each position, points of time at which the intensity is equal to or greater than the predetermined threshold in the measurement data are plotted on a graph (map) in which the horizontal axis represents the position (distance from the sensing apparatus 52) and the vertical axis represents time. Thus, the traveling trajectory data 500 in which the horizontal axis represents the position and the vertical axis represents time is obtained. That is, the traveling trajectory data 500 is a map including a position (a distance from the sensing apparatus 52) and a time.

As described above, the traveling trajectory data 500 in FIG. 4 is data regarding a road in which a direction oriented to the sensing apparatus 52 is a traveling direction of the vehicle, and the vehicle moves away from the sensing apparatus 52 toward the right side and moves close to the sensing apparatus 52 toward the left side. That is, the left side of the traveling trajectory data 500 corresponds to the front side of the road (the downstream side in the traveling direction of the vehicle), and the right side of the traveling trajectory data 500 corresponds to the rear side of the road (the upstream side in the traveling direction of the vehicle). The lower side of the traveling trajectory data 500 is closer to a present time, and the upper side of the traveling trajectory data 500 is a past time. The traveling trajectory data 500 is also referred to as waterfall data because the trajectory appears to move downward as time passes.

Here, depending on a situation of the road 80, there is a region such as a bridge where vibration occurs constantly or a region where vibration is strong. Alternatively, due to an influence of noise or the like, the intensity may increase on the measurement data although the vibration is not actually strong. In this case, there is a likelihood that the traveling trajectory data 500 does not appropriately represent a trajectory of each vehicle. Accordingly, in order to remove the influence, the optical fiber sensing system 50 performs a normalization process on the traveling trajectory data 500 (step S904). Thus, an oblique line in the traveling trajectory data 500 favorably represents the trajectory Tr of each vehicle to some extent.

Subsequently, the optical fiber sensing system 50 divides the traveling trajectory data 500 into a plurality of patches (step S906). For example, as illustrated in FIG. 4, the optical fiber sensing system 50 divides the traveling trajectory data 500 into patches 502 (sections) each having a size of a length of 1 km in the horizontal direction (spatial direction) and a length of 1 minute (min) in the vertical direction (temporal direction). Here, the patch 502 corresponds to a unit in which the estimated speed is calculated. That is, for each patch 502, an average estimated speed of a vehicle traveling at a position corresponding to the patch 502 at the time corresponding to the patch 502 is obtained from the inclination of each trajectory included in the patch 502.

An arrow Pa indicates an image of a specific example of the traveling trajectory data 500 divided into the patches 502. Here, in the actual traveling trajectory data 500, as indicated by an ellipse, a trajectory (oblique line) may be broken due to the influence of noise or the like. Accordingly, the optical fiber sensing system 50 according to the comparative example removes noise contained in each patch 502 using the analysis engine 92 (step S908). The analysis engine 92 can be realized by a machine learning algorithm such as deep neural network (DNN). The analysis engine 92 is learned so as to output the traveling trajectory data in which the inclination of the oblique line appropriately indicates the speed by many pieces of training data corresponding to the traveling trajectory data represented by a position (distance) and a time. The analysis engine 92 receives the traveling trajectory data (image data) of each patch 502 as an input, and outputs the traveling trajectory data (image data) in which an influence of noise is removed and the oblique line represents a speed. The optical fiber sensing system 50 calculates the average estimated speed corresponding to each patch 502 from the inclination of each traveling trajectory (oblique line) in the traveling trajectory data output from the analysis engine 92 (step S910). Specifically, the optical fiber sensing system 50 calculates the speed from the inclination of each oblique line (trajectory) included in the patch 502 and calculates the average estimated speed in the patch 502 by averaging the calculated speeds.

Figure 5:
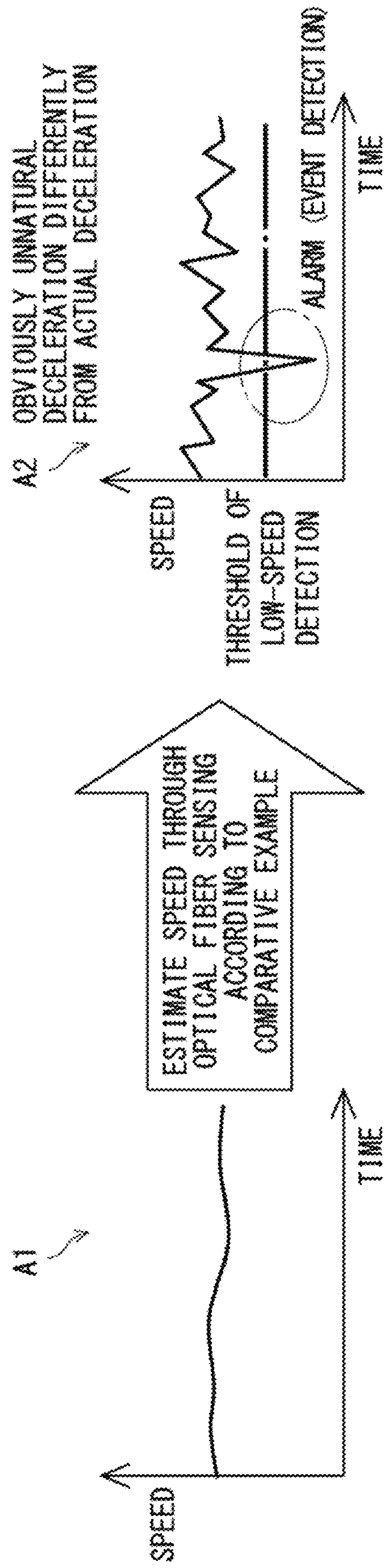
FIG. 5 is a diagram illustrating event detection according to the comparative example.

FIG. 5 is a diagram illustrating event detection according to the comparative example. FIG. 5 illustrates a temporal transition of the speed at a certain position. When there is no accident, congestion, or the like as in the speed data indicated by an arrow A1, a continuous speed change may occur actually. However, in the above-described analysis engine 92, there is a likelihood that the influence of noise or the like is not completely removable. That is, noise occurring in the traveling trajectory data 500 can depend on a use environment of the optical fiber cable 54 such as a state of the road 80 (a bridge, a tunnel, or the like) and a state of the vehicle Ve traveling on the road 80 (a weight of the vehicle, or the like). Since the analysis engine 92 can be learned for common use in any environment, there is concern of an influence of noise or the like being difficult to remove appropriately for various environments (special environments) as described above only by using the analysis engine 92.

Accordingly, like speed data indicated by an arrow A2, in the method according to the comparative example, there is a likelihood that obviously unnatural deceleration is estimated differently from actual deceleration due to the influence of noise or the like. In other words, this unnatural deceleration is an estimated speed due to erroneous estimation caused due to the influence of noise or the like. In this case, when the estimated speed due to erroneous estimation is less than a threshold for low-speed detection, there is a likelihood that erroneous detection occurs, for example, an event such as congestion is detected although the event does not actually occur. Therefore, there is a likelihood that an alarm is erroneous, such as alarm indicating that an event occurs, although an event such as congestion does not actually occur.

On the other hand, the signal analysis apparatus 1 according to the present example embodiment detects an event based on at least one of a corrected speed obtained by performing a smoothing process on an estimated speed and an inaccuracy degree indicating the inaccuracy degree of the estimated speed. Here, the corrected speed is obtained by correcting the estimated speed due to erroneous estimation. Accordingly, by detecting the event based on the corrected speed, erroneous detection of the event is curbed, and thus the event can be appropriately detected. For the estimated speed due to erroneous estimation, the corresponding inaccuracy degree may increase. Accordingly, it is possible to prevent the event detection from being performed for the estimated speed with a large inaccuracy degree. Accordingly, by detecting the event based on the inaccuracy degree, erroneous detection of the event is curbed, and thus the event can be appropriately detected.

It is also possible to appropriately detect an event even when a signal analysis system including the signal analysis apparatus 1, the sensing apparatus 52, and the optical fiber cable 54 is used. It is possible to appropriately detect an event even when a signal analysis method and a program for executing the signal analysis method realized by the signal analysis apparatus 1 are used.

First Example Embodiment

Hereinafter, an example embodiment will be described with reference to the drawings. To clarify description, in the following description and drawings, omission and simplification are made as appropriate. In each drawing, the same elements are denoted by the same reference signs, and redundant description will be omitted as necessary.

Figure 6:
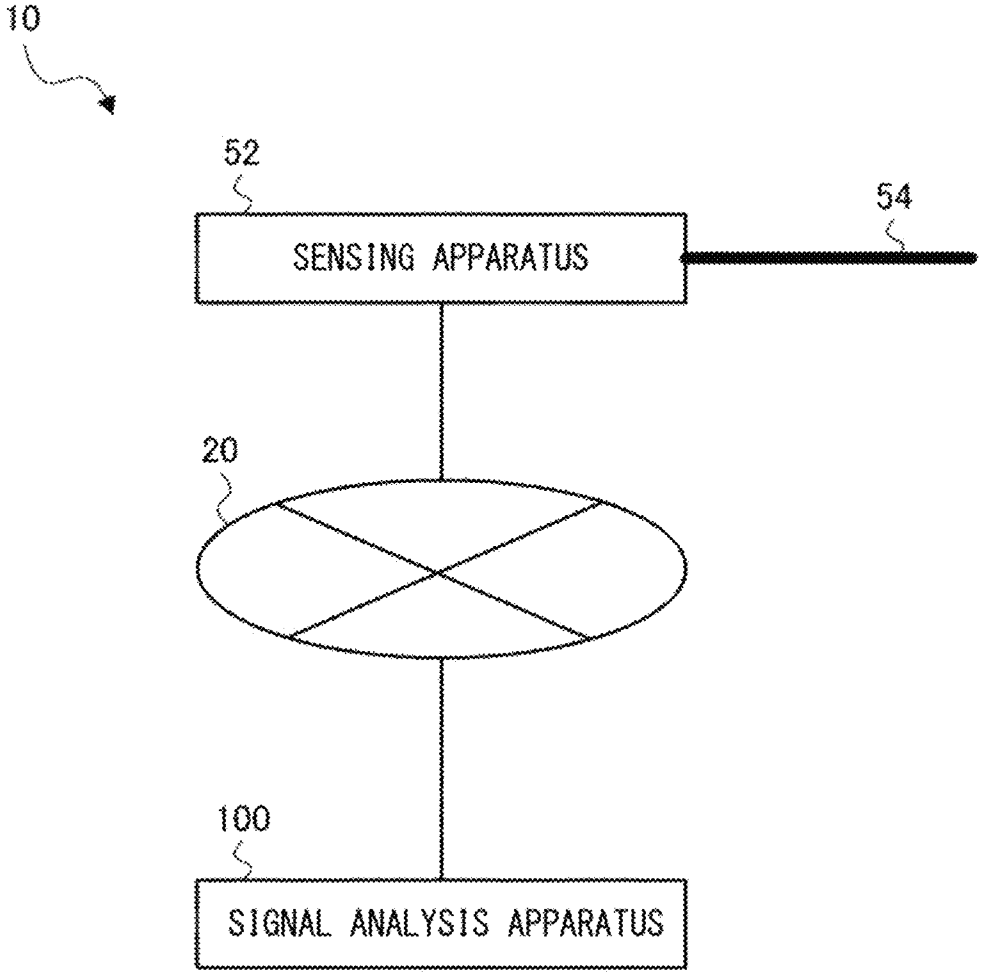
FIG. 6 is a diagram illustrating a signal analysis system according to a first example embodiment.

FIG. 6 is a diagram illustrating a signal analysis system 10 according to a first example embodiment. The signal analysis system 10 includes a sensing apparatus 52, an optical fiber cable 54, and a signal analysis apparatus 100. The signal analysis apparatus 100 is communicably connected to the sensing apparatus 52 via a wired or wireless network 20.

As described above, the sensing apparatus 52 causes pulsed light to be incident on the optical fiber cable 54 and receives returned light. Thus, the sensing apparatus 52 acquires measurement data of the returned light (signal) at each position of the optical fiber cable 54. The sensing apparatus 52 transmits the measurement data (signal) at each position of the optical fiber cable 54 to the signal analysis apparatus 100.

The signal analysis apparatus 100 corresponds to the signal analysis apparatus 1 illustrated in FIG. 1. The signal analysis apparatus 100 is, for example, a computer such as a server or a personal computer. The signal analysis apparatus 100 estimates a speed of the vehicle traveling on the road 80 using the signal obtained through the measurement by the sensing apparatus 52, and detects an event generated on the road using the estimated speed (estimated speed). Details will be described below.

Figure 7:
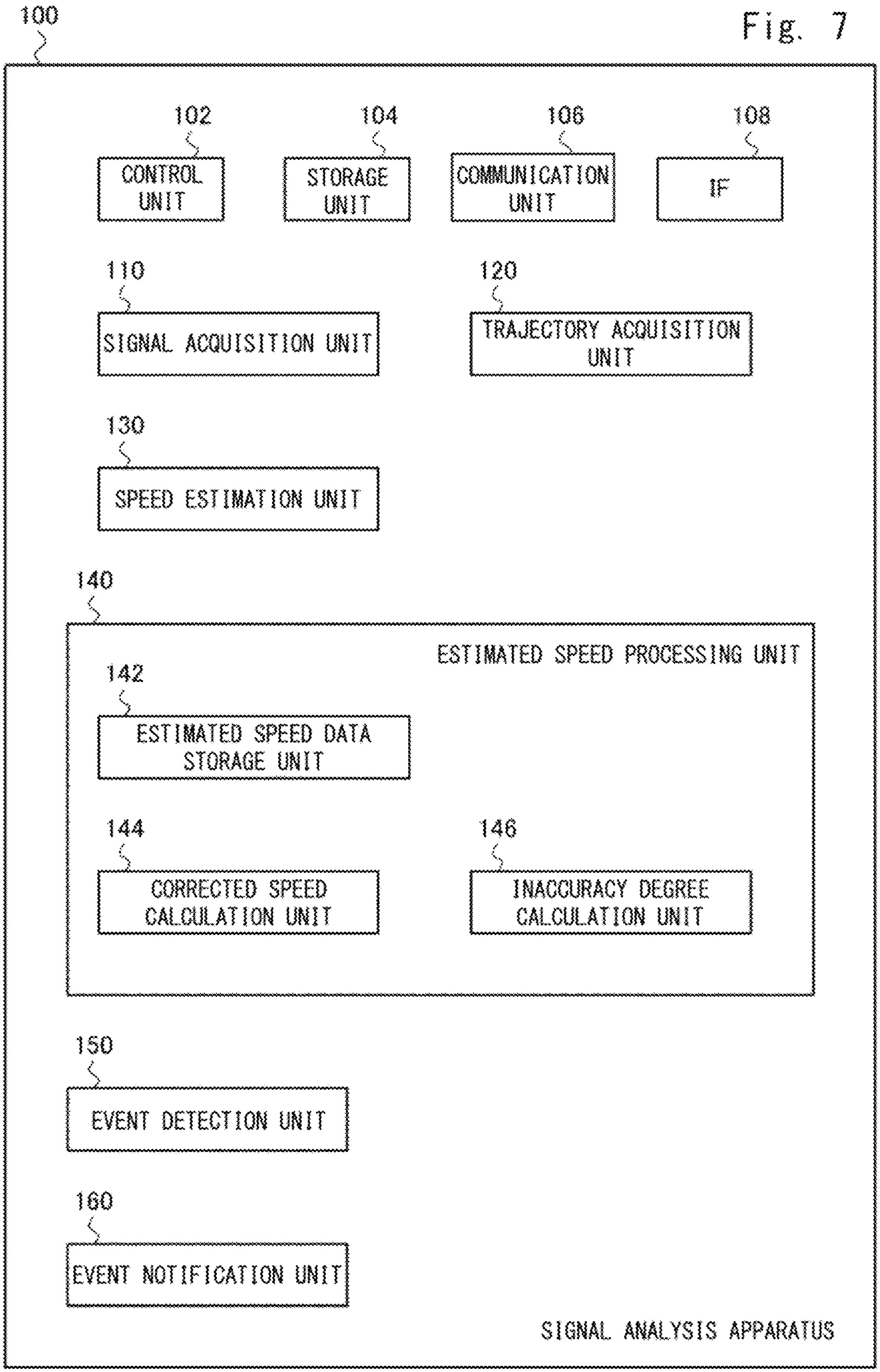
FIG. 7 is a diagram illustrating a configuration of a signal analysis apparatus according to the first example embodiment.

FIG. 7 is a diagram illustrating a configuration of the signal analysis apparatus 100 according to the first example embodiment. As illustrated in FIG. 7, the signal analysis apparatus 100 includes, as a main hardware configuration, a control unit 102, a storage unit 104, a communication unit 106, and an interface unit 108 (interface (IF)). The control unit 102, the storage unit 104, the communication unit 106, and the interface unit 108 are connected to each other via a data bus or the like. The sensing apparatus 52 can also have the hardware configuration of the signal analysis apparatus 100 illustrated in FIG. 7.

The control unit 102 is, for example, a processor such as a central processing unit (CPU). The control unit 102 has a function as a calculation device that performs a control process, a calculation process, and the like. The control unit 102 may include a plurality of processors. The storage unit 104 is, for example, a storage device such as a memory or a hard disk. The storage unit 104 is, for example, a read only memory (ROM), a random access memory (RAM), or the like. The storage unit 104 has a function of storing a control program, a calculation program, and the like executed by the control unit 102. That is, the storage unit 104 (memory) stores one or more instructions. The storage unit 104 has a function of temporarily storing processing data and the like. The storage unit 104 may include a database. The storage unit 104 may include a plurality of memories.

The communication unit 106 performs a process necessary for communicating with other apparatuses such as the sensing apparatus 52 via a network. The communication unit 106 may include a communication port, a router, a firewall, and the like. The interface unit 108 (interface (IF)) is, for example, a user interface (UI). The interface unit 108 includes an input device such as a keyboard, a touch panel, or a mouse, and an output device such as a display or a speaker. The interface unit 108 may be configured such that the input device and the output device are integrated, for example, like a touch screen (touch panel). The interface unit 108 receives a data inputting operation by a user (operator) and outputs information to the user. The interface unit 108 outputs, for example, the fact that an event is generated when the event is detected.

The signal analysis apparatus 100 according to the first example embodiment includes, as components, a signal acquisition unit 110, a trajectory acquisition unit 120, a speed estimation unit 130, an estimated speed processing unit 140, an event detection unit 150, and an event notification unit 160. The estimated speed processing unit 140 includes an estimated speed data storage unit 142, a corrected speed calculation unit 144, and an inaccuracy degree calculation unit 146.

The signal acquisition unit 110 has a function as signal acquisition means. The trajectory acquisition unit 120 has a function as trajectory acquisition means. The speed estimation unit 130 corresponds to the estimation unit 2 illustrated in FIG. 1. The speed estimation unit 130 has a function as speed estimation means (estimation means). The estimated speed processing unit 140 has a function as estimated speed processing means. The estimated speed data storage unit 142 has a function as estimated speed data storage means. The corrected speed calculation unit 144 has a function as corrected speed calculation means. The inaccuracy degree calculation unit 146 has a function as inaccuracy degree calculation means. The event detection unit 150 corresponds to the event detection unit 4 illustrated in FIG. 1. The event detection unit 150 has a function as event detection means. The event notification unit 160 has a function as event notification means.

Each of the above-described components can be realized, for example, by executing a program under the control of the control unit 102. More specifically, each component can be realized by causing the control unit 102 to execute a program (command) stored in the storage unit 104. Each component may be realized by recording a necessary program in any nonvolatile recording medium and installing the program as necessary. Each component is not limited to be realized by software by a program, and may be realized by any combination of hardware, firmware, and software. Each component may be realized using an integrated circuit such as a field-programmable gate array (FPGA) or a microcomputer that can be programmed by a user. In this case, the integrated circuit may be used to realize a program including the foregoing components. A specific function of each component will be described below with reference to FIG. 8 and the like.

Figure 8:
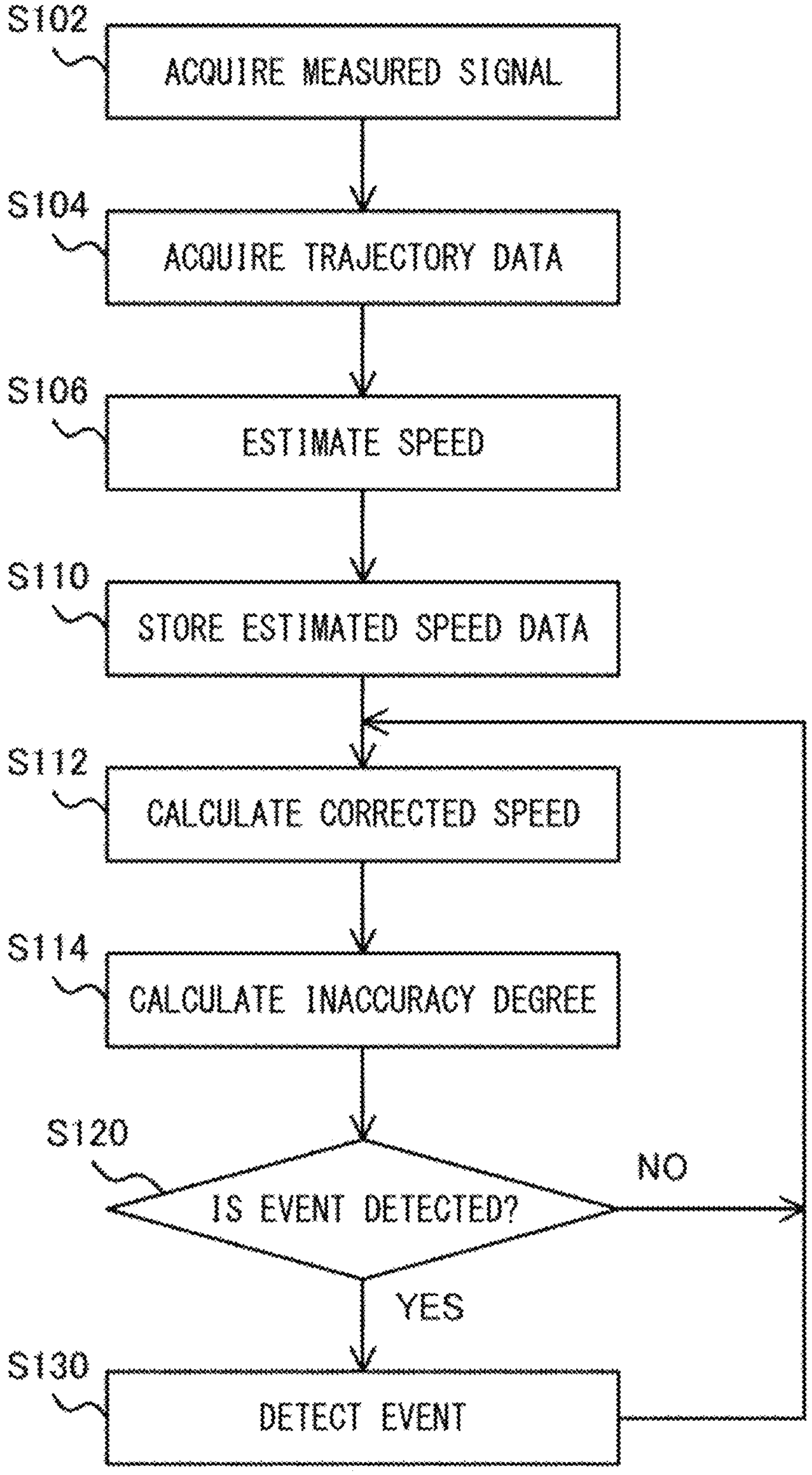
FIG. 8 is a flowchart illustrating a signal analysis method executed by the signal analysis apparatus according to the first example embodiment.

FIG. 8 is a flowchart illustrating a signal analysis method executed by the signal analysis apparatus 100 according to the first example embodiment. The signal acquisition unit 110 acquires the measured signal (step S102). Specifically, the signal acquisition unit 110 acquires the measurement data (signal) from the sensing apparatus 52.

The trajectory acquisition unit 120 acquires the trajectory data (step S104). Specifically, the trajectory acquisition unit 120 acquires trajectory data (the traveling trajectory data 500) indicating a traveling trajectory of each vehicle using the measurement data acquired from the sensing apparatus 52 like the above-described optical fiber sensing system 50. As described above, the trajectory data is a map including a position (a distance from the sensing apparatus 52) and a time. The process of the trajectory acquisition unit 120 corresponds to the above-described process of S902.

The speed estimation unit 130 estimates the speed of the vehicle traveling on the road (step S106). Specifically, the speed estimation unit 130 estimates the speed of the vehicle traveling on the road at each of times at each of positions on the road using the trajectory data (the traveling trajectory data 500). More specifically, like the above-described optical fiber sensing system 50, the speed estimation unit 130 divides the traveling trajectory data 500 into the patches 502 with a size of a predetermined distance and a predetermined time, and calculates the estimated speed of the vehicle corresponding to the patch 502 for each of the divided patches 502. The process of the speed estimation unit 130 corresponds to the above-described processes of S904 to S910.

The estimated speed processing unit 140 performs a process on the calculated estimated speed (S110 to S114). The estimated speed data storage unit 142 stores the estimated speed data (step S110). Specifically, the estimated speed data storage unit 142 stores the estimated speed data indicating a value of the estimated speed for each position and time (that is, each patch) calculated by the speed estimation unit 130. The estimated speed data storage unit 142 can be realized by the storage unit 104. The estimated speed data may be, for example, data in a comma separated value (CSV) format or data in a two-dimensional matrix format including position and time components.

Figure 9:
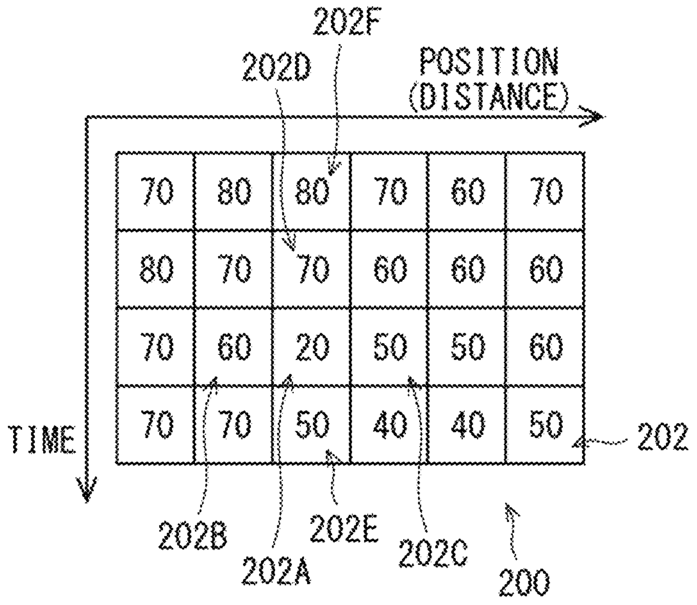
FIG. 9 is a diagram illustrating an estimated speed map according to the first example embodiment.

FIG. 9 is a diagram illustrating an estimated speed map 200 according to the first example embodiment. The estimated speed map can be formed by the estimated speed data stored in the estimated speed data storage unit 142. In the estimated speed map 200 illustrated in FIG. 9, the horizontal axis represents a position (a distance from the sensing apparatus 52), and the vertical axis represents time. The right direction of the horizontal axis of the estimated speed map 200 corresponds to a direction away from the sensing apparatus 52. Here, when the estimated speed map 200 illustrated in FIG. 9 corresponds to a road in which the direction oriented to the sensing apparatus 52 is the traveling direction of the vehicle, the left direction of the estimated speed map 200 corresponds to the front of the road (the downstream direction of the traveling direction of the vehicle). On the other hand, the right direction of the estimated speed map 200 corresponds to the rear of the road (the upstream direction of the traveling direction of the vehicle). The downward direction of the vertical axis of the estimated speed map 200 corresponds to the direction of the passage of time. The interface unit 108 that is a display may display the estimated speed map 200.

The estimated speed map 200 illustrated in FIG. 9 is divided for each of the plurality of patches 202. The patch 202 corresponds to the patch 502 illustrated in FIG. 4. Accordingly, a numerical value described in each patch 202 of the estimated speed map 200 in FIG. 9 indicates an estimated speed at a position and time of the corresponding patch 202. The "position of the patch 202" does not indicate strictly one point on a space (on the road) and can correspond to a spatial region of a predetermined range (a patch size of 1 km or the like) along the road. Similarly, the "time of the patch 202" does not indicate a strict time on the time axis and can correspond to a time domain of a predetermined range (a patch size of 1 minute, or the like) along the time axis.

For example, in FIG. 9, an estimated speed at a position (first position) and a time (first time) corresponding to a patch 202A is 20 (km/h). A patch 202B on the left side of the patch 202A corresponds to a position near the position (first position) corresponding to the patch 202A at the time (first time) corresponding to the patch 202A. Similarly, a patch 202C on the right side of the patch 202A corresponds to a position near the position (first position) corresponding to the patch 202A at the time (first time) corresponding to the patch 202A.

The patch 202B corresponds to a position closer to the sensing apparatus 52 by one patch (for example, 1 km) than the position (first position) corresponding to the patch 202A at the same time as the time (first time) corresponding to the patch 202A. The estimated speed at the position and time corresponding to the patch 202B is 60 (km/h). The patch 202C corresponds to a position farther from the sensing apparatus 52 by one patch (for example, 1 km) than the position (first position) corresponding to the patch 202A at the same time as the time (first time) corresponding to the patch 202A. The estimated speed at the position and time corresponding to the patch 202C is 50 (km/h).

An upper patch 202D of the patch 202A corresponds to a time near the time (first time) corresponding to the patch 202A at the position (first position) corresponding to the patch 202A. Similarly, a lower patch 202E of the patch 202A corresponds to a time near the time (first time) corresponding to the patch 202A at the position (first position) corresponding to the patch 202A. Further, a patch 202F located above the patch 202A by two patches may also correspond to a time near a time (first time) corresponding to the patch 202A at a position (first position) corresponding to the patch 202A along with the patch 202D.

The patch 202D corresponds to a time earlier than the time (first time) corresponding to the patch 202A by one patch (for example, 1 minute) at the same position as the position (first position) corresponding to the patch 202A. The estimated speed at the position and time corresponding to the patch 202D is 70 (km/h). The patch 202E corresponds to a time later than the time (first time) corresponding to the patch 202A by one patch (for example, 1 minute) at the same position as the position (first position) corresponding to the patch 202A. The estimated speed at the position and time corresponding to the patch 202E is 50 (km/h). The patch 202F corresponds to a time earlier than the time (first time) corresponding to the patch 202A by two patches (for example, 2 minutes) at the same position as the position (first position) corresponding to the patch 202A. The estimated speed at the position and time corresponding to the patch 202F is 80 (km/h).

The description will be made again with reference to FIG. 8. The corrected speed calculation unit 144 calculates a corrected speed by performing a smoothing process on a corresponding estimated speed for each patch 202 (step S112). Specifically, the corrected speed calculation unit 144 calculates the corrected speed obtained by correcting the estimated speed of the patch X by performing the smoothing process using the estimated speed(s) of the patch(es) 202 (near) around the patch 202 (patch X) in which the corrected speed is to be calculated. That is, the corrected speed calculation unit 144 performs the smoothing process using at least one of the estimated speed(s) of the patch(es) 202 at the position near the position of the patch X at the time of the patch X and the estimated speed(s) of the patch(es) 202 at the position of the patch X at the time near the time of the patch X.

Here, it is assumed that the patch X corresponds to the first time of the first position, and the estimated speed of the patch X is the first estimated speed. In this case, the corrected speed calculation unit 144 performs the smoothing process on the first estimated speed using at least one of the estimated speed of the position near the first position at the first time and the estimated speed of the first position at the time near the first time. Thus, the corrected speed calculation unit 144 calculates the corrected speed related to the estimated speed (first estimated speed) of the patch X.

Figure 10:
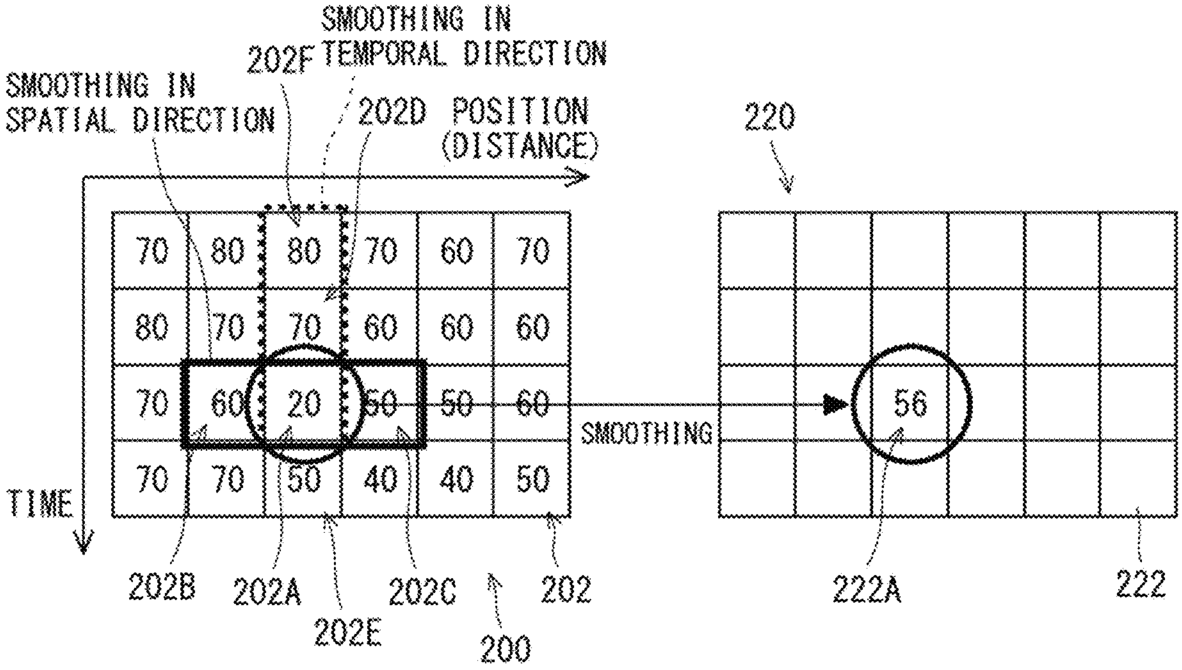
FIG. 10 is a diagram illustrating a process of a corrected speed calculation unit according to the first example embodiment.

FIG. 10 is a diagram illustrating a process of the corrected speed calculation unit 144 according to the first example embodiment. FIG. 10 illustrates an example of a method of calculating the corrected speed obtained by correcting the estimated speed related to the patch 202A illustrated in FIG. 9. In the example of FIG. 10, the corrected speed calculation unit 144 performs the smoothing in the spatial direction and the smoothing in the temporal direction on the estimated speed of the patch 202A. Specifically, the corrected speed calculation unit 144 performs the smoothing process using the estimated speed related to the patch 202A, the estimated speed related to the patch 202B, the estimated speed related to the patch 202C, the estimated speed related to the patch 202D, and the estimated speed related to the patch 202F. That is, the corrected speed calculation unit 144 performs the smoothing in the spatial direction using one patch 202B and one patch 202C before and after the patch 202A at the same time as the patch 202A. On the other hand, the corrected speed calculation unit 144 performs the smoothing in the temporal direction using the past two patches 202D and 202F of the patch 202A at the same position as the patch 202A.

More specifically, as the smoothing process, the corrected speed calculation unit 144 calculates an average value of the estimated speeds of the patches 202A, 202B, 202C, 202D, and 202F. The calculated average value corresponds to the corrected speed. That is, the corrected speed calculation unit 144 calculates the corrected speed by calculating an average value of the estimated speed of the patch X in which the corrected speed is to be calculated and the estimated speeds of the patches around the patch X. In the example of FIG. 10, the corrected speed calculation unit 144 calculates the corrected speed as (20+60+50+70+80)/5=56 (km/h) with respect to the estimated speed (20 km/h) of the patch 202A. The corrected speed calculation unit 144 generates the corrected speed map 220 illustrated in FIG. 10 by performing a similar process on all the patches 202. In the corrected speed map 220 illustrated in FIG. 10, only the corrected speed (56 km/h) related to a patch 222A corresponding to the patch 202A of the estimated speed map 200 is illustrated. However, actually, the corrected speed is calculated for all the patches 222. The interface unit 108 that is a display may display the corrected speed map 220.

In the foregoing example, the smoothing in the spatial direction and the smoothing in the temporal direction are performed on the estimated speed of the patch X in which the corrected speed is to be calculated, but the present invention is not limited thereto. That is, only the smoothing in the spatial direction or only the smoothing in the temporal direction may be performed on the estimated speed of the patch X in which the corrected speed is to be calculated. For example, when a resolution in the spatial direction is not good, that is, when a size of the patch 202 in the spatial direction (position direction; in the lateral direction) is large (for example, about 10 km), there is a likelihood that the estimated speeds of the adjacent patches 202 is not unnatural even when the estimated speeds are greatly different from each other. Accordingly, in this case, only the smoothing in the temporal direction may be performed.

In the foregoing example, when the smoothing process is performed, the estimated speed of the patch X and the estimated speeds of the four surrounding patches X are used, but the present invention is not limited thereto. Any number of patches X used in the smoothing process is used. In the foregoing example, as the smoothing process, the estimated speed of the patch X and the estimated speeds and the average (simple average) of the four surrounding patches X are calculated, but the present invention is not limited thereto. Any smoothing process can be performed. For example, the smoothing process may be performed using a weighted average.

In the foregoing example, for the smoothing in the temporal direction, the estimated speed of the patch earlier than (that is, in the past) the time of the patch X in which the corrected speed is to be calculated is used. However, when the estimated speed related to the patch later than the time of the patch X in which the corrected speed is to be calculated has already been calculated, the smoothing process may be performed using the estimated speed of the patch later than the time of the patch X in which the corrected speed is to be calculated. On the other hand, by performing the smoothing process using the estimated speed of the patch earlier than the time of the patch X in which the corrected speed is to be calculated, it is possible to calculate the corrected speed immediately after the estimated speed of the patch X in which the corrected speed is to be calculated is calculated. Accordingly, it is possible to guarantee immediacy of the calculation of the corrected speed and immediacy of the event detection to be described below.

The description will be made again with reference to FIG. 8. The inaccuracy degree calculation unit 146 calculates the inaccuracy degree of the estimated speed for each patch 202 (step S114). Specifically, the inaccuracy degree calculation unit 146 calculates the inaccuracy degree for the estimated speed of the patch X using the estimated speed(s) of the patch(es) 202 around (near) the patch 202 (patch X) in which the inaccuracy degree is to be calculated. That is, the inaccuracy degree calculation unit 146 calculates the inaccuracy degree using at least one of the estimated speed(s) of the patch(es) 202 at the position near the position of the patch X at the time of the patch X and the estimated speed(s) of the patch(es) 202 at the position of the patch X at the time near the time of the patch X.

Here, it is assumed that the patch X corresponds to the first time of the first position, and the estimated speed of the patch X is the first estimated speed. In this case, the inaccuracy degree calculation unit 146 calculates the inaccuracy degree for the first estimated speed using at least one of the estimated speed at the position near the first position at the first time and the estimated speed at the first position at the time near the first time. Thus, the inaccuracy degree calculation unit 146 calculates the inaccuracy degree related to the estimated speed (first estimated speed) of the patch X.

As the inaccuracy degree calculated for the estimated speed of the patch X increases, there is a high likelihood that the estimated speed of the patch X deviates from an actual speed due to an influence of noise or the like. That is, the higher the inaccuracy degree calculated for the estimated speed of the patch X is, the lower validity of the estimated speed of the patch X is. The inaccuracy degree may correspond to, for example, variations in the estimated speed of the patch X and the estimated speed(s) of the patch(es) 202 around the patch X. That is, the inaccuracy degree may increase as the variations in the first estimated speed (the estimated speed of the patch X), the estimated speed of the position near the first position at the first time, and the estimated speed at the first position at the time near the first time increase. The inaccuracy degree may be, for example, an index representing a variation, such as a variance, a standard deviation, or an average deviation. The inaccuracy degree may be, for example, an average value of differences between the estimated speed of the patch X and the estimated speed of each of the plurality of patches 202 around the patch X as an index representing the variation. That is, the inaccuracy degree calculation unit 146 may calculate, as the inaccuracy degree, an index representing a variation between the first estimated speed and at least one of the estimated speed of the position near the first position at the first time and the estimated speed at the first position at the time near the first time.

Figure 11:
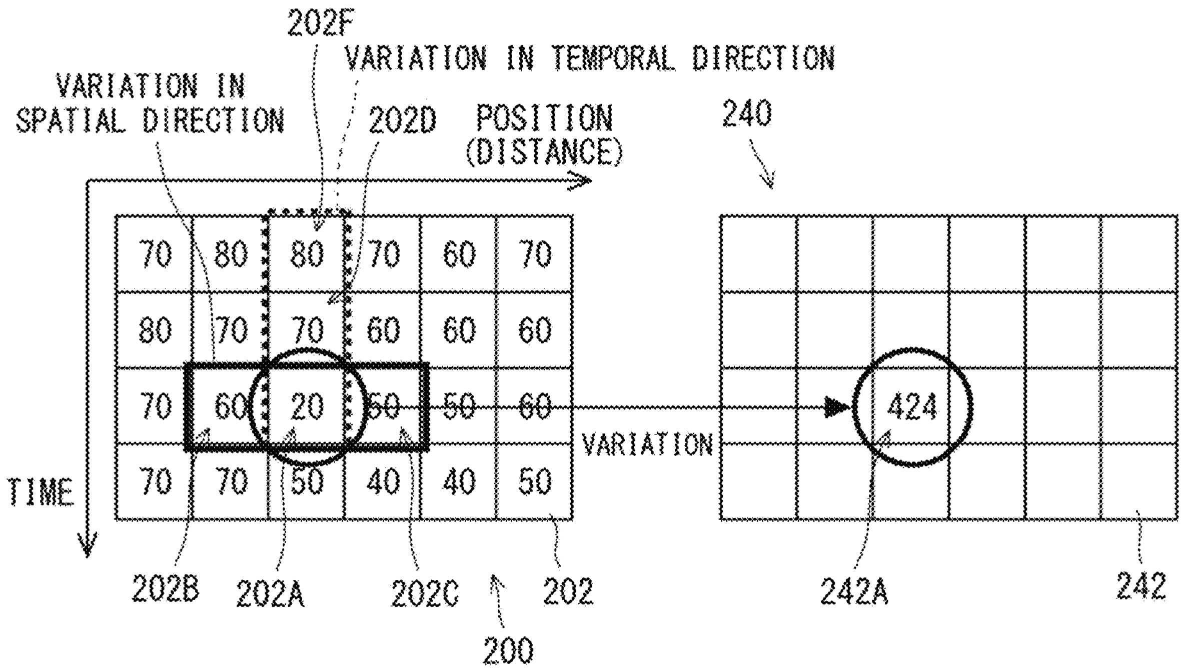
FIG. 11 is a diagram illustrating a process of an inaccuracy degree calculation unit according to the first example embodiment.
Figure 12:
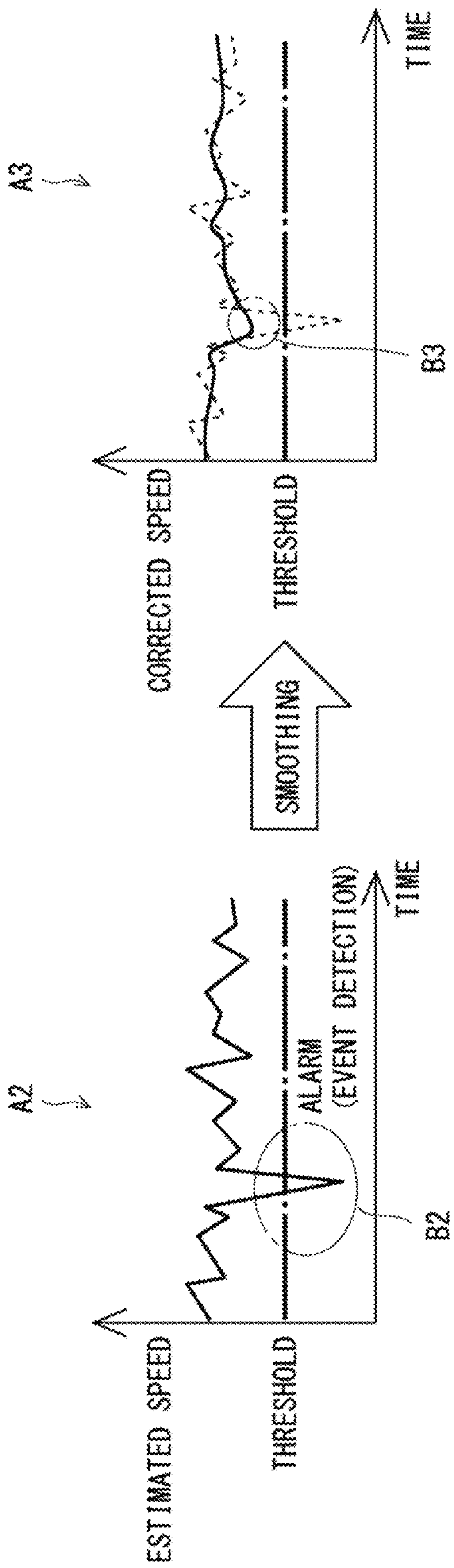
FIG. 12 is a diagram illustrating an effect of performing event detection using a corrected speed and an inaccuracy degree.

FIG. 11 is a diagram illustrating a process of the inaccuracy degree calculation unit 146 according to the first example embodiment. FIG. 11 illustrates an example of a method of calculating the inaccuracy degree with respect to the estimated speed related to the patch 202A illustrated in FIG. 9. Similarly to the example of FIG. 10, in the example of FIG. 11, the inaccuracy degree calculation unit 146 calculates the inaccuracy degree for the estimated speed of the patch 202A from the variation in the spatial direction and the variation in the temporal direction. Specifically, the inaccuracy degree calculation unit 146 calculates the inaccuracy degree using the estimated speed related to the patch 202A, the estimated speed related to the patch 202B, the estimated speed related to the patch 202C, the estimated speed related to the patch 202D, and the estimated speed related to the patch 202F. That is, the inaccuracy degree calculation unit 146 calculates the inaccuracy degree using one patch 202B and one patch 202C before and after the patch 202A at the same time as the patch 202A in the spatial direction. On the other hand, the inaccuracy degree calculation unit 146 calculates the inaccuracy degree using the past two patches 202D and 202F of the patch 202A at the same position as the patch 202A in the temporal direction.

More specifically, in the example of FIG. 11, the inaccuracy degree calculation unit 146 calculates the variance of the estimated speed related to each of the patches 202A, 202B, 202C, 202D, and 202F as the inaccuracy degree with respect to the estimated speed of the patch 202A. That is, the inaccuracy degree calculation unit 146 calculates the inaccuracy degree by calculating the variance between the estimated speed of the patch X in which the inaccuracy degree is to be calculated and the estimated speed(s) of the patch(es) around the patch X. In the example of FIG. 11, the inaccuracy degree calculation unit 146 calculates the variance to $\{(20-56)^2+(60-56)^2+(50-56)^2+(70-56)^2+(80-56)^2\}/5=424$ as the inaccuracy degree with respect to the estimated speed (20 km/h) of the patch 202A. The inaccuracy degree calculation unit 146 generates the inaccuracy degree map 240 illustrated in FIG. 11 by performing a similar process for all the patches 202. In an inaccuracy degree map 240 illustrated in FIG. 11, only the inaccuracy degree (424) related to a patch 242A corresponding to the patch 202A of the estimated speed map 200 is illustrated. However, actually, the inaccuracy degree is calculated for all the patches 242. The interface unit 108 that is a display may display the inaccuracy degree map 240.

In the foregoing example, the inaccuracy degree associated with the variation in the spatial direction and the variation in the temporal direction is calculated for the estimated speed of the patch X in which the inaccuracy degree is to be calculated, but the present invention is not limited thereto. That is, for the estimated speed of the patch X in which the inaccuracy degree is to be calculated, the inaccuracy degree associated with only the variation in the spatial direction may be calculated, or the inaccuracy degree associated with only the variation in the temporal direction may be calculated. As described above, when a resolution in the spatial direction is not good, that is, when the size of the patch 202 in the spatial direction (the position direction; the horizontal direction) is large (for example, about 10 km), there is a likelihood that the estimated speeds of the adjacent patches 202 is not unnatural even when the estimated speeds are greatly different from each other. Accordingly, in this case, the inaccuracy degree may be calculated in consideration of only variations in the temporal direction.

In the foregoing example, when the inaccuracy degree is calculated, the estimated speed of the patch X and the estimated speeds of the four surrounding patches X are used, but the present invention is not limited thereto. Any number of patches X used to calculate the inaccuracy degree is used. In the foregoing example, the patch 202 used to calculate the inaccuracy degree for the estimated speed of the patch X is the same as the patch 202 used to perform the smoothing process on the estimated speed of the patch X, but the present invention is not limited thereto. In the foregoing example, the variance between the estimated speed of the patch X and the estimated speeds of the surrounding patches X is calculated as the inaccuracy degree for the estimated speed of the patch X, but the present invention is not limited thereto. The inaccuracy degree can be calculated using an index representing any variation. For example, as the inaccuracy degree for the estimated speed of the patch X, the standard deviation between the estimated speed of the patch X and the estimated speeds of the four surrounding patches X may be calculated, or the average deviation of the estimated speeds may be calculated.

In the foregoing example, the estimated speed of the patch earlier than (that is, in the past) the time of the patch X in which the inaccuracy degree is to be calculated is used for the variation in the temporal direction. However, when the estimated speed of the patch later than the time of the patch X in which the inaccuracy degree is to be calculated has already been calculated, the inaccuracy degree may be calculated using the estimated speed of the patch later than the time of the patch X in which the inaccuracy degree is to be calculated. On the other hand, by calculating the inaccuracy degree using the estimated speed of the patch earlier than the time of the patch X in which the inaccuracy degree is to be calculated, it is possible to calculate the inaccuracy degree immediately after the estimated speed of the patch X in which the inaccuracy degree is to be calculated is calculated. Accordingly, it is possible to guarantee the immediacy of the calculation of the inaccuracy degree and the immediacy of event detection to be described below.

The description will be made again with reference to FIG. 8. The event detection unit 150 detects an event for each patch 202 (step S120). That is, for each patch 202, the event detection unit 150 determines whether an event causing a decrease in a speed of a vehicle (such as congestion) is detected. In other words, for each patch 202, the event detection unit 150 determines whether an event occurs at the position of the road corresponding to the patch 202 at the time corresponding to the patch 202 by using the corrected speed and the inaccuracy degree corresponding to the patch 202.

Specifically, for each patch 202, the event detection unit 150 determines whether the corresponding corrected speed is equal to or less than a predetermined threshold Vth (first threshold) and the corresponding inaccuracy degree is equal to or less than a predetermined threshold Dth (second threshold). When this determination is positive, the event detection unit 150 determines that an event occurs at a position corresponding to the patch 202 and a time corresponding to the patch 202. Conversely, when this determination is negative, the event detection unit 150 determines that an event does not occur at the position corresponding to the patch 202 and the time corresponding to the patch 202.

When an event is detected (YES in S120), the event notification unit 160 issues an alarm indicating that an event occurs at a position corresponding to the patch 202 and a time corresponding to the patch 202 (step S130). For example, the event notification unit 160 may perform control such that a display mode of the patch 202 in which the event is detected is more conspicuous than display modes of the other patches 202 in the estimated speed map 200 displayed on the interface unit 108. Alternatively, the event notification unit 160 may perform control such that display indicating that an event occurs at a position corresponding to the patch 202 and a time corresponding to the patch 202 is output to the interface unit 108 that is a display. Alternatively, the event notification unit 160 may perform control such that a voice indicating that an event occurs at a position corresponding to the patch 202 and a time corresponding to the patch 202 is output to the interface unit 108 that is a speaker. Then, a processing flow returns to S112, and a similar process is performed on the other patches 202.

Conversely, when the event is not detected (NO in S120), the process of S130 is not performed. Then, the processing flow returns to S112, and a similar process is performed on the other patches 202.

FIGS. 12 to 16 are diagrams illustrating effects obtained by performing the event detection using the corrected speed and the inaccuracy degree. For traffic flow on a road, it is usually extremely rare that, at a certain time, a vehicle speed at a certain position is greatly different from (considerably slower than) a vehicle speed at a position around the position. Similarly, at a position, it is usually very rare for the vehicle speed at a time to be greatly different from (greatly slower than) the vehicle speed at a time around the time. Accordingly, there is a high likelihood that the estimated speed greatly different from the surrounding position and time is a speed erroneously estimated under the influence of noise or the like.

For example, in the estimated speed map 200 of FIGS. 9 to 11, the estimated speed (20 km/h) of the patch 202A is considerably slower than the estimated speeds of the surrounding patches 202 (202B, 202C, 202D, 202E, and 202F). Accordingly, there is a likelihood that the estimated speed of the patch 202A is an erroneous speed affected by noise or the like. In this case, as indicated by an ellipse B2 of the speed data indicated by the arrow A2 in FIG. 12, there is a likelihood that the estimated speed is equal to or lower than the threshold (Vth) for low-speed detection although the vehicle speed at the position at the time is actually not so low. In this case, assuming that an event is detected, there is a likelihood that the occurrence of the event is alarmed.

On the other hand, by performing the smoothing process as described above, as illustrated in FIG. 10, the estimated speed of the patch 202A is corrected using the estimated speed of the surrounding patches 202. Thus, the difference between the corrected speed (56 km/h) of the patch 202A and the corrected speeds of the surrounding patches 202 can be reduced. Thus, the estimated speed of the patch 202A is a corrected speed at which the influence of noise or the like is curbed and can be close to an actual vehicle speed. Thus, a speed change is suppressed as indicated by an ellipse B3 of the speed data indicated by an arrow A3 in FIG. 12. Accordingly, when the vehicle speed is not actually reduced, the vehicle speed (corrected speed) for the event detection is curbed from being less than the threshold for low-speed detection. Accordingly, it is possible to curb the occurrence of an erroneous alarm indicating that an event occurs although an event such as congestion does not actually occur. Accordingly, it is possible to appropriately detect an event.

Figure 13:
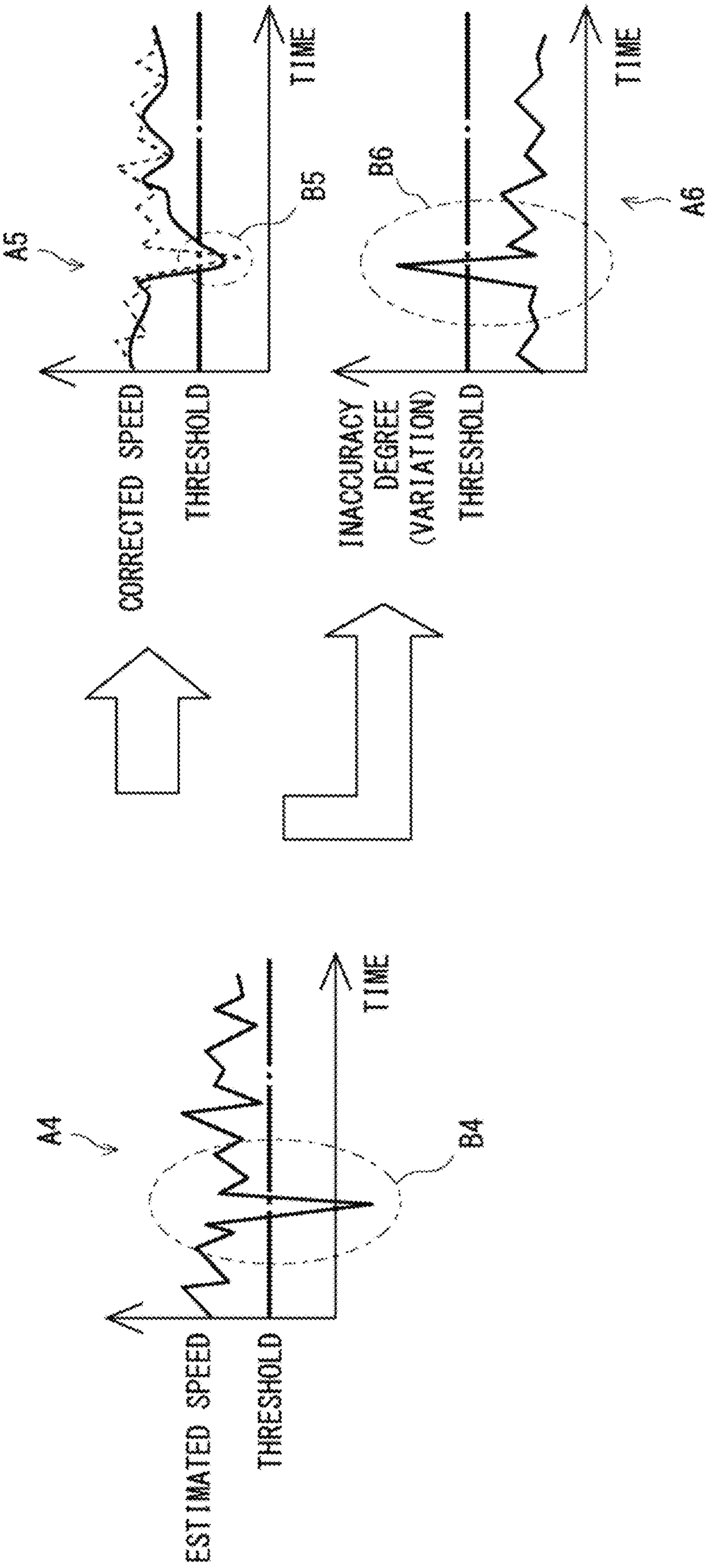
FIG. 13 is a diagram illustrating an effect of performing event detection using a corrected speed and an inaccuracy degree.

When the influence of noise or the like is greatly large like speed data indicated by an arrow A4 in FIG. 13, an error between the actual vehicle speed and the estimated speed may be considerably large. In this case, the estimated speed may be greatly less than the threshold. In this case, even when the estimated speed is corrected through smoothing like speed data indicated by an arrow A5, the corrected speed may remain to be equal to or less than the threshold as indicated by an ellipse B5.

On the other hand, the estimated speed can be determined to be inaccurate by calculating the inaccuracy degree (variation) as described above. That is, the estimated speed of which the inaccuracy degree is large is greatly affected by noise or the like and is not reliable because there is a high likelihood that the estimated speed is affected due to erroneous estimation. Specifically, in the inaccuracy degree data indicated by an arrow A6, when the inaccuracy degree is equal to or greater than the threshold (Dth) like an ellipse B6, it is assumed that the event detection is not performed using the corresponding speed (the corrected speed and the estimated speed). In this case, even when the speed (the corrected speed and the estimated speed) at that time is equal to or less than the threshold, it is determined that an event is not detected. Accordingly, when erroneous estimation such as a steep decrease in the estimated speed occurs like the example of FIG. 13, an event is curbed from being issued. Accordingly, even if, even when the estimated speed is corrected through the smoothing, the corrected speed is equal to or less than the threshold due to a large influence of noise or the like, while an event does not actually occur, the erroneous alarm is curbed from being issued. Accordingly, it is possible to detect an event more appropriately.

Figure 14:
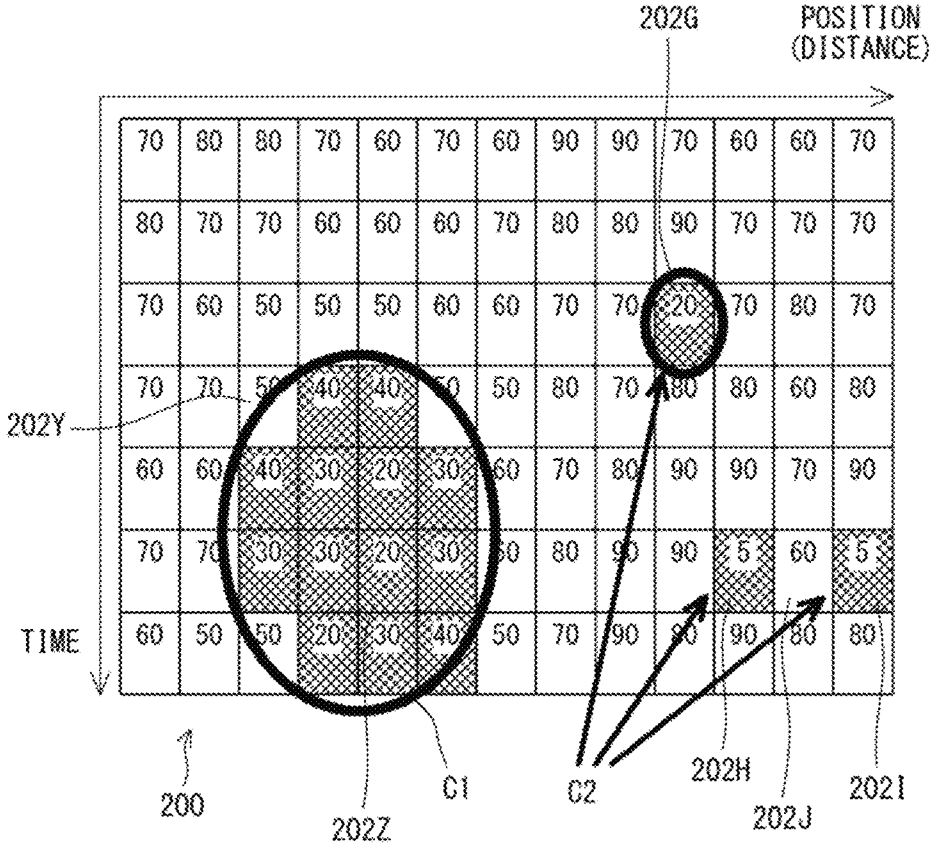
FIG. 14 is a diagram illustrating an effect of performing event detection using a corrected speed and an inaccuracy degree.
Figure 15:
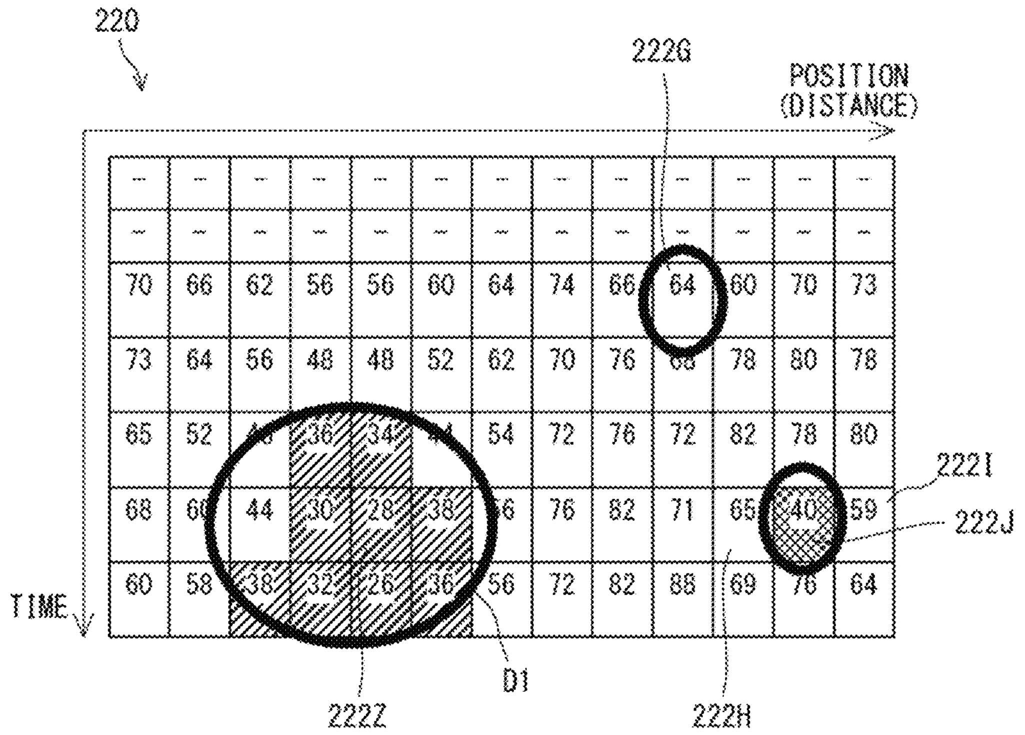
FIG. 15 is a diagram illustrating an effect of performing event detection using a corrected speed and an inaccuracy degree.
Figure 16:
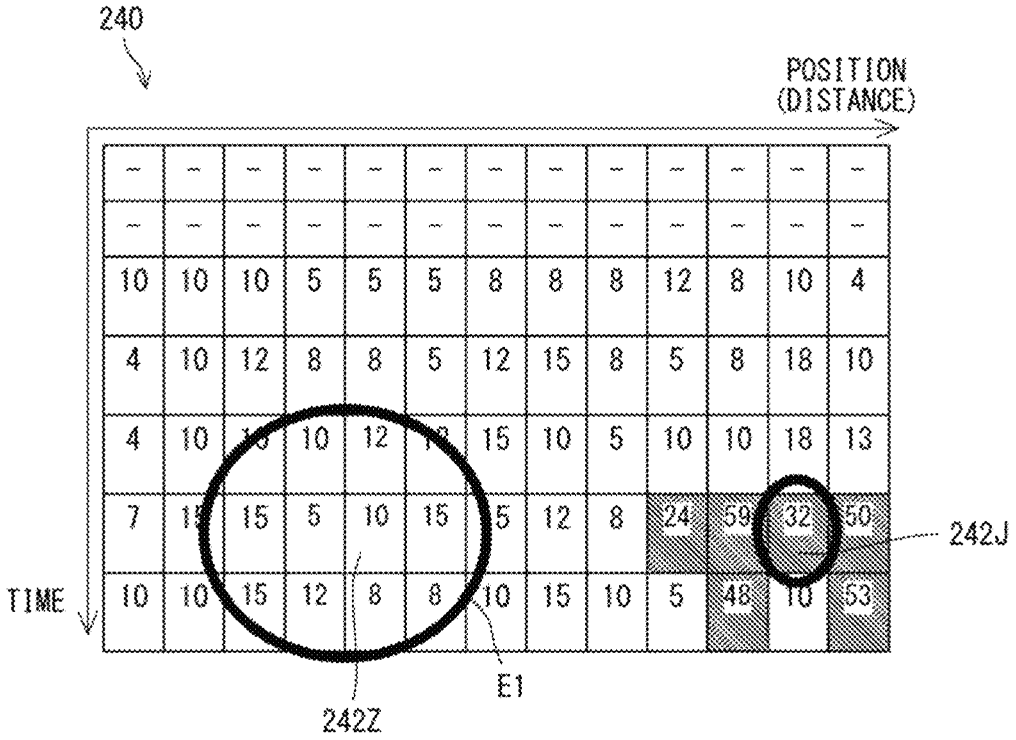
FIG. 16 is a diagram illustrating an effect of performing event detection using a corrected speed and an inaccuracy degree.

FIG. 14 illustrates a specific example of the estimated speed map 200. FIG. 15 illustrates a specific example of the corrected speed map 220 corresponding to the estimated speed map 200 illustrated in FIG. 14. FIG. 16 illustrates a specific example of the inaccuracy degree map 240 corresponding to the estimated speed map 200 illustrated in FIG. 14.

In the estimated speed map 200 illustrated in FIG. 14, the horizontal axis represents a position (a distance from the sensing apparatus 52), and the vertical axis represents time. The right direction of the horizontal axis of the estimated speed map 200 corresponds to a direction away from the sensing apparatus 52. Here, the estimated speed map 200 illustrated in FIG. 14 corresponds to a road in which a direction oriented to the sensing apparatus 52 is a traveling direction of the vehicle. Accordingly, the left direction of the estimated speed map 200 illustrated in FIG. 14 corresponds to the front of the road (the downstream direction of the traveling direction of the vehicle). On the other hand, the right direction of the estimated speed map 200 corresponds to the rear of the road (the upstream direction of the traveling direction of the vehicle). The downward direction of the vertical axis of the estimated speed map 200 corresponds to the direction of the passage of time. The vertical axis and the horizontal axis are similar to the corrected speed map 220 illustrated in FIG. 15 and the inaccuracy degree map 240 illustrated in FIG. 16.

Here, in the examples of FIGS. 14 to 16, the threshold of the corrected speed is Vth=40 km/h. That is, when an event such as congestion occurs, the vehicle speed is equal to or less than 40 km/h at the position and time at which the event occurs. In other words, when the vehicle speed is greater than 40 km/h, it may be considered that the event does not occur. In the examples of FIGS. 14 to 16, the threshold of the inaccuracy degree is Dth=20. That is, the estimated speed of the patch 202 corresponding to a patch 242 of which the inaccuracy degree is equal to or less than 20 can be considered to be reliably accurate. Conversely, the estimated speed of the patch 202 corresponding to the patch 242 of which the inaccuracy degree is greater than 20 can be considered to be inaccurate to the extent that the estimated speed cannot be used for the event detection.

In the estimated speed map 200 illustrated in FIG. 14, the hatched patches 202 are the patches 202 of which the estimated speed is equal to or less than the threshold Vth. Of the patches, a true low-speed event occurs in the patches 202 indicated by an ellipse C1 in FIG. 14. That is, at the times and positions corresponding to the patches 202, a vehicle speed (average speed) actually decreases due to a low-speed event such as congestion.

Here, when a low-speed event such as congestion actually occurs, a portion in which the vehicle speed (average vehicle speed) becomes low on the road propagates backward (upstream in the traveling direction of the vehicle) with passage of time. For example, it is assumed that a cause of congestion occurs at a position corresponding to a patch 202Y and a time corresponding to the patch 202Y. In this case, in the estimated speed map 200, in the temporal direction, the speed becomes low in the patch 202 corresponding to a later time from the time. In the spatial direction, the speed becomes low in the patch 202 corresponding to the rear side from the position. Accordingly, when the cause of the congestion occurs at the position and the time corresponding to the patch 202Y, the low-speed event propagates to the time and the position after the patch 202Y.

Accordingly, in a patch 202 (for example, a patch 202Z) in which a true low speed event is occurring, the estimated speed (vehicle speed) can decrease in the surrounding patches 202. Then, in the patches 202 indicated by the ellipse C1 in FIG. 14, the estimated speed decreases to a threshold or less, which does not mean that the estimated speed decreases due to erroneous estimation because of the influence of noise or the like, and can mean that the estimated speed also decreases as the actual vehicle speed decreases.

In this way, in the patch 202 in which the true low-speed event occurs, not only the estimated speed of the patch 202 but also the estimated speed of the surrounding patches 202 are reduced. Accordingly, when the corrected speed calculation unit 144 calculates the corrected speed with respect to the estimated speed of the patch X in which the true low-speed event occurs using the estimated speed of the surrounding patches 202, the corrected speed calculation unit 144 can calculate the corrected speed with a low speed value. In the corrected speed map 220 illustrated in FIG. 15, in patches 222 (for example, a patch 222Z) indicated by an ellipse D1 corresponding to the patches 202 indicated by the ellipse C1 in FIG. 14, the corrected speed also decreases to the threshold or less.

In the patch 202 in which the true low-speed event occurs, not only the estimated speed of the patch 202 but also the estimated speeds of the surrounding patches 202 are reduced. Accordingly, when the inaccuracy degree calculation unit 146 calculates the inaccuracy degree for the estimated speed of the patch X in which the true low-speed event occurs using the estimated speed of the surrounding patches 202, the inaccuracy degree calculation unit 146 can calculate the low inaccuracy degree because of a small variation in the estimated speeds. In the inaccuracy degree map 240 illustrated in FIG. 16, the inaccuracy degree is equal to or less than the threshold in the patches 242 (for example, the patch 242Z) indicated by an ellipse E1 corresponding to the patches 202 indicated by the ellipse C1 in FIG. 14. Accordingly, the event detection unit 150 can accurately detect that the event occurs for the patch 202 in which the true low-speed event occurs. Accordingly, the event notification unit 160 can accurately issue an alarm indicating that an event occurs to the patch 202 in which a true low-speed event occurs.

On the other hand, in patches 202G, 202H, and 202I indicated by the arrow C2 in FIG. 14, the estimated speed is equal to or less than the threshold Vth. In the surrounding patches 202, however, the estimated speed does not decrease to be equal to or less than the threshold. Accordingly, in the patches 202G, 202H, and 202I, there is a high likelihood that the event not actually occurs. That is, there is a high likelihood that the estimated speed related to the patches 202G, 202H, and 202I decrease due to erroneous estimation because of the influence of noise or the like.

Here, when the corrected speed calculation unit 144 calculates the corrected speed with respect to the estimated speed of the patch 202G using the estimated speeds of the surrounding patches 202, the calculated corrected speed is greater than the threshold Vth like the corrected speed of a patch 222G of the corrected speed map 220 illustrated in FIG. 15. Accordingly, the event detection unit 150 determines that an event does not occur at the position and time corresponding to the patch 202G. That is, the event detection unit 150 does not detect an event for the patch 202G in which the event does not occur. As described above, the event detection unit 150 can accurately detect an event. Thus, the event notification unit 160 can curb an erroneous alarm, such as an alarm indicating that an event occurs, from being issued to the patch 202 in which the event does not occur.

When the corrected speed calculation unit 144 calculates the corrected speed with respect to the estimated speed of the patch 202H using the estimated speeds of the surrounding patches 202, the calculated corrected speed is greater than the threshold Vth like the corrected speed of a patch 222H of the corrected speed map 220 illustrated in FIG. 15. Similarly, when the corrected speed calculation unit 144 calculates the corrected speed with respect to the estimated speed of the patch 202I using the estimated speeds of the surrounding patches 202, the calculated corrected speed is greater than the threshold Vth like the corrected speed of a patch 222I of the corrected speed map 220 illustrated in FIG. 15. Accordingly, the event detection unit 150 determines that an event does not occurs at the positions and times corresponding to the patches 202H and 202I. That is, the event detection unit 150 does not detect an event for the patches 202H and 202I in which the event does not occur. As described above, the event detection unit 150 can accurately detect an event.

Conversely, when the corrected speed calculation unit 144 calculates the corrected speed with respect to the estimated speed of the patch 202J that does not exceed the threshold, the calculated corrected speed is equal to or less than the threshold Vth like the corrected speed of a patch 222J of the corrected speed map 220 illustrated in FIG. 15. This is because the estimated speeds of the patches 202H and 202I around the patch 202J decrease due to erroneous estimation. Here, in the inaccuracy degree map 240 illustrated in FIG. 16, the inaccuracy degree is greater than the threshold (Dth=20) in the patch 242J corresponding to the patch 222J in FIG. 15. Accordingly, the event detection unit 150 determines that an event does not occur at the position and time corresponding to the patch 202J. That is, the event detection unit 150 does not detect an event for the patch 202J in which the event does not occur. As described above, the event detection unit 150 can accurately detect an event.

Even when the corrected speed obtained for the patch 202 in which an event does not actually occur is equal to or less than the threshold like the patch 202J, an event can be curbed from being erroneously detected by performing event detection using the inaccuracy degree. Accordingly, the event detection can be performed more accurately using the corrected speed and the inaccuracy degree. Accordingly, it is possible to further curb an erroneous alarm.

Modified Example

The present invention is not limited to the foregoing example embodiments, and can be modified as appropriate without departing from the gist and the scope of the present invention. For example, the order of the steps (processes) in the above-described flowchart can be changed as appropriate. One or more of the steps (processes) in the flowchart can be omitted as appropriate. For example, in the flowchart of FIG. 8, the order of the process of S112 and the process of S114 may be reversed. Alternatively, the process of S112 and the process of S114 may be executed in parallel.

Alternatively, only either the process of S112 or the process of S114 may be executed. When only the process of S112 is executed, the event detection unit 150 determines in the process of S120 whether the corresponding corrected speed is equal to or less than the threshold Vth for each patch 202. When the corrected speed is equal to or less than the threshold Vth, the event detection unit 150 determines that an event occurs at a position corresponding to the patch 202 and a time corresponding to the patch 202. Conversely, when the corrected speed is not equal to or less than the threshold Vth, the event detection unit 150 determines that the event does not occur at the position corresponding to the patch 202 and the time corresponding to the patch 202.

On the other hand, when only the process of S114 is executed, the event detection unit 150 determines in the process of S120 whether the corresponding estimated speed is equal to or less than the threshold Vth and the corresponding inaccuracy degree is equal to or less than the threshold Dth for each patch 202. When this determination is positive, the event detection unit 150 determines that an event occurs at a position corresponding to the patch 202 and a time corresponding to the patch 202. That is, in this case, since the estimated speed corresponding to the patch 202 is reliable (that is, not due to erroneous estimation) and the estimated speed decreases to the threshold Vth or less, it is determined that an event occurs. Conversely, when this determination is negative, the event detection unit 150 determines that an event does not occur at the position corresponding to the patch 202 and the time corresponding to the patch 202. That is, when the inaccuracy degree is not equal to or less than the threshold Dth, the corresponding estimated speed is unreliable. Therefore, the event detection is not performed based on the unreliable estimated speed. When the estimated speed is not equal to or less than the threshold Vth, there is a high likelihood that a speed reduction event does not occur. Therefore, it is not determined that an event occurs.

In the above-described example embodiment, the sizes of the patches are uniform. However, the sizes of the patches may not be uniform. For example, the sizes of the patches divided in the traveling trajectory data 500 may be different depending on the positions of the patches. The same applies to the sizes of the patches of the estimated speed map 200, the corrected speed map 220, and the inaccuracy degree map 240.

In the above-described example embodiment, an estimated speed of a vehicle traveling on a road is acquired using a signal obtained through the optical fiber sensing. However, the estimated speed of the vehicle may be acquired using a signal obtained according to a method other than the optical fiber sensing.

The above-described program includes a command group (or software codes) for causing a computer to perform one or more functions that have been described in the example embodiments when the program is read by the computer. The program may be stored in a non-transitory computer-readable medium or a tangible storage medium. As examples and not by way of limitation, the computer-readable medium or the tangible storage medium includes a random-access memory (RAM), a read-only memory (ROM), a flash memory, a solid-state drive (SSD) and any other memory technique, a CD-ROM, a digital versatile disk (DVD), a Blu-ray (registered trademark) disc or any other optical disk storage, a magnetic cassette, a magnetic tape, a magnetic disk storage, and any other magnetic storage device. The program may be transmitted on a transitory computer-readable medium or a communication medium. As examples and not by way of limitation, the transitory computer-readable medium or the communication medium include electrical, optical, acoustic and signals, or propagated signals in other forms.

Some or all of the above-described example embodiments can be described as in the following Supplementary Notes, but are not limited to the following Supplementary Notes.

Supplementary Note 1

A signal analysis apparatus including:

estimation means for estimating a speed of a vehicle traveling on a road at each of times at each of positions on the road using a signal obtained by measuring the road; and event detection means for detecting an event occurring on the road based on at least one of a corrected speed obtained by performing a smoothing process on an estimated speed that has been estimated and an inaccuracy degree indicating a degree of inaccuracy of the estimated speed.

Supplementary Note 2

The signal analysis apparatus according to Supplementary Note 1, wherein the event detection means detects an event when the corrected speed is equal to or less than a predetermined first threshold.

Supplementary Note 3

The signal analysis apparatus according to Supplementary Note 2, wherein the event detection means detects an event when the corrected speed is equal to or less than the first threshold and the inaccuracy degree is equal to or less than a predetermined second threshold.

Supplementary Note 4

The signal analysis apparatus according to any one of Supplementary Notes 1 to 3, further including: corrected speed calculation means for calculating a corrected speed related to a first estimated speed at a first position by performing the smoothing process on the first estimated speed at the first position at a first time using at least one of an estimated speed at a position near the first position at the first time and an estimated speed at the first position at a time near the first time.

Supplementary Note 5

The signal analysis apparatus according to Supplementary Note 4, wherein the corrected speed calculation means calculates a corrected speed related to the first estimated speed by performing the smoothing process using an estimated speed at the first position at a time earlier than the first time.

Supplementary Note 6

The signal analysis apparatus according to any one of Supplementary Notes 1 to 5, further including: inaccuracy degree calculation means for calculating the inaccuracy degree at a first estimated speed of a first position at a first time using at least one of an estimated speed at a position near the first position at the first time and an estimated speed at the first position at a time near the first time.

Supplementary Note 7

The signal analysis apparatus according to Supplementary Note 6, wherein the inaccuracy degree calculation means calculates the inaccuracy degree using an estimated speed at the first position at a time earlier than the first time.

Supplementary Note 8

The signal analysis apparatus according to Supplementary Note 6 or 7, wherein the inaccuracy degree calculation means calculates an index representing a variation between the first estimated speed and at least one of the estimated speed at the position near the first position at the first time and the estimated speed at the first position at a time near the first time as the inaccuracy degree.

Supplementary Note 9

The signal analysis apparatus according to Supplementary Note 6 or 7, wherein the inaccuracy degree calculation means calculates the inaccuracy degree so that the inaccuracy degree of the first estimated speed increases as variations in the first estimated speed, the estimated speed at the position near the first position at the first time, and the estimated speed at the first position at the time near the first time increases.

Supplementary Note 10

The signal analysis apparatus according to any one of Supplementary Notes 1 to 9, wherein the estimation means estimates the speed of the vehicle using a signal detected using an optical fiber provided along the road.

Supplementary Note 11

A signal analysis method including:

estimating a speed of a vehicle traveling on a road at each of times at each of positions on the road using a signal obtained by measuring the road; and detecting an event occurring on the road based on at least one of a corrected speed obtained by performing a smoothing process on an estimated speed that has been estimated and an inaccuracy degree indicating a degree of inaccuracy of the estimated speed.

Supplementary Note 12

The signal analysis method according to Supplementary Note 11, further including detecting an event when the corrected speed is equal to or less than a predetermined first threshold.

Supplementary Note 13

The signal analysis method according to Supplementary Note 12, further including detecting an event when the corrected speed is equal to or less than the first threshold and the inaccuracy degree is equal to or less than a predetermined second threshold.

Supplementary Note 14

The signal analysis method according to any one of Supplementary Notes 11 to 13, further including calculating a corrected speed related to a first estimated speed at a first position by performing the smoothing process on the first estimated speed at the first position at a first time using at least one of an estimated speed at a position near the first position at the first time and an estimated speed at the first position at a time near the first time.

Supplementary Note 15

The signal analysis method according to Supplementary Note 14, further including calculating a corrected speed related to the first estimated speed by performing the smoothing process using an estimated speed at the first position at a time earlier than the first time.

Supplementary Note 16

The signal analysis method according to any one of Supplementary Notes 11 to 15, further including calculating the inaccuracy degree at a first estimated speed of a first position at a first time using at least one of an estimated speed at a position near the first position at the first time and an estimated speed at the first position at a time near the first time.

Supplementary Note 17

The signal analysis method according to Supplementary Note 16, further including calculating the inaccuracy degree using an estimated speed at the first position at a time earlier than the first time.

Supplementary Note 18

The signal analysis method according to Supplementary Note 16 or 17, further including calculating an index representing a variation between the first estimated speed and at least one of the estimated speed at the position near the first position at the first time and the estimated speed at the first position at a time near the first time as the inaccuracy degree.

Supplementary Note 19

The signal analysis method according to Supplementary Note 16 or 17, further including calculating the inaccuracy degree so that the inaccuracy degree of the first estimated speed increases as variations in the first estimated speed, the estimated speed at the position near the first position at the first time, and the estimated speed at the first position at the time near the first time increase.

Supplementary Note 20

The signal analysis method according to any one of Supplementary Notes 11 to 19, further including estimating the speed of the vehicle using a signal detected using an optical fiber provided along the road.

Supplementary Note 21

A non-transitory computer-readable medium storing a program for causing a computer to execute:

a step of estimating a speed of a vehicle traveling on a road at each of times at each of positions on the road using a signal obtained by measuring the road; and a step of detecting an event occurring on the road based on at least one of a corrected speed obtained by performing a smoothing process on an estimated speed that has been estimated and an inaccuracy degree indicating a degree of inaccuracy of the estimated speed.

REFERENCE SIGNS LIST

1 SIGNAL ANALYSIS APPARATUS
2 ESTIMATION UNIT
4 EVENT DETECTION UNIT
10 SIGNAL ANALYSIS SYSTEM
50 OPTICAL FIBER SENSING SYSTEM
52 SENSING APPARATUS
54 OPTICAL FIBER CABLE
80 ROAD
92 ANALYSIS ENGINE
100 SIGNAL ANALYSIS APPARATUS
110 SIGNAL ACQUISITION UNIT
120 TRAJECTORY ACQUISITION UNIT
130 SPEED ESTIMATION UNIT
140 ESTIMATED SPEED PROCESSING UNIT

142 ESTIMATED SPEED DATA STORAGE UNIT
144 CORRECTED SPEED CALCULATION UNIT
146 INACCURACY DEGREE CALCULATION UNIT
150 EVENT DETECTION UNIT
160 EVENT NOTIFICATION UNIT
200 ESTIMATED SPEED MAP
202 PATCH
220 CORRECTED SPEED MAP
222 PATCH
240 INACCURACY DEGREE MAP
242 PATCH
500 TRAVELING TRAJECTORY DATA
502 PATCH

What is claimed is:

1. A signal analysis apparatus comprising:

at least one memory configured to store instructions; and at least one processor in communication with an optical fiber sensing system that includes a sensing apparatus coupled to an optical fiber cable, the at least one processor configured to execute the instructions to:

estimate a speed of a vehicle traveling on a road at each of a plurality of times at each of a plurality of positions on the road using a signal obtained by measuring the road with the optical fiber sensing system, each of the plurality of positions corresponding to a spatial region of a predetermined range along the road, and each of the plurality of times corresponding to a time domain of a predetermined range along a time axis;

calculate a corrected speed related to a first estimated speed which is a speed estimated at a first position among the plurality of positions at a first time among the plurality of times by performing a smoothing process on the first estimated speed at the first position at the first time using an estimated speed at at least one second position at the first time and an estimated speed at the first position at at least one second time, the second position being a position near the first position in the plurality of position, the second time being near the first time among the plurality of times;

calculate an inaccuracy degree at the first estimated speed using an estimated speed at the second position at the first time and an estimated speed at the first position at the second time; the inaccuracy degree indicating a degree of inaccuracy of the first estimated speed; and detect an event occurring on the road based on at least one of a corrected speed obtained by performing a smoothing process on the first estimated speed and the inaccuracy degree indicating a degree of inaccuracy of the first estimated speed.

2. The signal analysis apparatus according to claim 1, wherein the at least one processor is further configured to execute the instructions to detect an event when the corrected speed is equal to or less than a predetermined first threshold.

3. The signal analysis apparatus according to claim 2, wherein the at least one processor is further configured to execute the instructions to detect an event when the corrected speed is equal to or less than the first threshold and the inaccuracy degree is equal to or less than a predetermined second threshold.

4. The signal analysis apparatus according to claim 1, wherein the at least one processor is further configured to execute the instructions to calculate a corrected speed related to the first estimated speed by performing the smoothing process using an estimated speed at the first position at a time earlier than the first time.

5. The signal analysis apparatus according to claim 1, wherein the at least one processor is further configured to execute the instructions to calculate the inaccuracy degree using an estimated speed at the first position at a time earlier than the first time.

6. The signal analysis apparatus according to claim 1, wherein the at least one processor is further configured to execute the instructions to calculate an index representing a variation between the first estimated speed and at least one of the estimated speed at the position near the first position at the first time and the estimated speed at the first position at a time near the first time as the inaccuracy degree.

7. The signal analysis apparatus according to claim 1, wherein the at least one processor is further configured to execute the instructions to calculate the inaccuracy degree so that the inaccuracy degree of the first estimated speed increases as variations in a first estimated speed, the estimated speed at the position near the first position at the first time, and the estimated speed at the first position at the time near the first time increase.

8. The signal analysis apparatus according to claim 1, wherein the at least one processor is further configured to execute the instructions to estimate the speed of the vehicle using a signal detected using an optical fiber provided along the road.

9. The signal analysis apparatus of claim 1, including:

the optical fiber sensing system, wherein the sensing apparatus is configured to cause pulsed light to be incident on the optical fiber cable.

10. The signal analysis apparatus according to claim 1, wherein the at least one processor is further configured to, in accordance with a determination that the event has been detected, control an interface unit to issue an alarm indicating that the event has occurred.

11. A signal analysis method comprising:

estimating a speed of a vehicle traveling on a road at each of a plurality of times at each of a plurality of positions on the road using a signal obtained by measuring the road with an optical fiber sensing system that includes a sensing apparatus coupled to an optical fiber cable, each of the plurality of positions corresponding to a spatial region of a predetermined range along the road, and each of the plurality of times corresponding to a time domain of a predetermined range along a time axis;

calculating a corrected speed related to a first estimated speed which is a speed estimated at a first position among the plurality of positions at a first time among the plurality of times by performing a smoothing process on the first estimated speed at the first position at the first time using an estimated speed at at least one second position at the first time and an estimated speed at the first position at at least one second time, the second position being a position near the first position in the plurality of position, the second time being near the first time among the plurality of times;

calculating an inaccuracy degree at the first estimated speed using an estimated speed at the second position at the first time and an estimated speed at the first position at the second time;

the inaccuracy degree indicating a degree of inaccuracy of the first estimated speed; and detecting an event occurring on the road based on at least one of a corrected speed obtained by performing a smoothing process on the first estimated speed and the inaccuracy degree indicating a degree of inaccuracy of the first estimated speed.

12. The signal analysis method according to claim 11, further comprising detecting an event when the corrected speed is equal to or less than a predetermined first threshold.

13. The signal analysis method according to claim 12, further comprising detecting an event when the corrected speed is equal to or less than the first threshold and the inaccuracy degree is equal to or less than a predetermined second threshold.

14. The signal analysis method according to claim 11, further comprising calculating a corrected speed related to the first estimated speed by performing the smoothing process using an estimated speed at the first position at a time earlier than the first time.

15. The signal analysis method according to claim 11, further comprising calculating the inaccuracy degree using an estimated speed at the first position at a time earlier than the first time.

16. The signal analysis method according to claim 11, further comprising calculating an index representing a variation between the first estimated speed and at least one of the estimated speed at the position near the first position at the first time and the estimated speed at the first position at a time near the first time as the inaccuracy degree.

17. The signal analysis method according to claim 11, further comprising calculating the inaccuracy degree so that the inaccuracy degree of the first estimated speed increases as variations in the first estimated speed, the estimated speed at the position near the first position at the first time, and the estimated speed at the first position at the time near the first time increase.

18. A non-transitory computer-readable medium storing a program for causing a computer to execute:

a step of estimating a speed of a vehicle traveling on a road at each of a plurality of times at each of a plurality of positions on the road using a signal obtained by measuring the road with an optical fiber sensing system that includes a sensing apparatus coupled to an optical fiber cable, each of the plurality of positions corresponding to a spatial region of a predetermined range along the road, and each of the plurality of times corresponding to a time domain of a predetermined range along a time axis;

a step of calculating a corrected speed related to a first estimated speed which is a speed estimated at a first position among the plurality of positions at a first time among the plurality of times by performing a smoothing process on the first estimated speed at the first position at the first time using an estimated speed at at least one second position at the first time and an estimated speed at the first position at at least one second time, the second position being a position near the first position in the plurality of position, the second time being near the first time among the plurality of times;

a step of calculating an inaccuracy degree at the first estimated speed using an estimated speed at the second position at the first time and an estimated speed at the first position at the second time; the inaccuracy degree indicating a degree of inaccuracy of the first estimated speed; and a step of detecting an event occurring on the road based on at least one of a corrected speed obtained by performing a smoothing process on the first estimated speed and the inaccuracy degree indicating a degree of inaccuracy of the first estimated speed.

* * * * *